United States Patent
Zhao et al.

(10) Patent No.: US 11,019,280 B2
(45) Date of Patent: May 25, 2021

(54) SYSTEMS AND METHODS FOR VIDEO PROCESSING AND DISPLAY

(71) Applicant: SZ DJI TECHNOLOGY CO., LTD., Shenzhen (CN)

(72) Inventors: Cong Zhao, Shenzhen (CN); Yannan Wu, Shenzhen (CN); Kang Yang, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 60 days.

(21) Appl. No.: 16/180,571

(22) Filed: Nov. 5, 2018

(65) Prior Publication Data
US 2019/0075252 A1 Mar. 7, 2019

Related U.S. Application Data

(63) Continuation of application No. PCT/CN2016/081292, filed on May 6, 2016.

(51) Int. Cl.
*H04N 5/262* (2006.01)
*H04N 13/161* (2018.01)
(Continued)

(52) U.S. Cl.
CPC ........... *H04N 5/2628* (2013.01); *G01C 21/00* (2013.01); *G01P 13/00* (2013.01); *H04N 7/181* (2013.01);
(Continued)

(58) Field of Classification Search
CPC ...... H04N 5/2628; H04N 5/28; H04N 19/597; H04N 13/194; H04N 13/161; H04N 7/181; H04N 7/185; G01C 21/00; G01P 13/00
See application file for complete search history.

(56) References Cited

U.S. PATENT DOCUMENTS

| | | | |
|---|---|---|---|
| 2010/0073519 A1* | 3/2010 | Onoe | G06T 7/33 348/231.99 |
| 2012/0019617 A1* | 1/2012 | Ahn | H04N 13/161 348/43 |

(Continued)

FOREIGN PATENT DOCUMENTS

| | | |
|---|---|---|
| CN | 102339021 A | 2/2012 |
| CN | 105222760 A | 1/2016 |
| CN | 105222761 A | 1/2016 |

OTHER PUBLICATIONS

The World Intellectual Property Organization (WIPO) International Search Report and Written Opinion for PCT/CN2016/081292 dated Jan. 25, 2017 8 pages.

*Primary Examiner* — Maria E Vazquez Colon
(74) *Attorney, Agent, or Firm* — Anova Law Group, PLLC

(57) ABSTRACT

A method for processing video data of an environment includes, with aid of one or more processors individually or collectively, obtaining in or near real-time a reference position of an imaging device located on a movable object based on one or more previously traversed positions of the imaging device, and modifying an image frame in the video data to obtain a modified image frame based on the reference position of the imaging device and an actual position of the imaging device at which the image frame is taken. The one or more previously traversed positions are obtained using at least one sensor on the movable object. The video data is acquired by the imaging device.

20 Claims, 9 Drawing Sheets

(51) Int. Cl.
  *H04N 19/597* (2014.01)
  *H04N 13/194* (2018.01)
  *G01C 21/00* (2006.01)
  *G01P 13/00* (2006.01)
  *H04N 7/18* (2006.01)
  *H04N 5/28* (2006.01)

(52) U.S. Cl.
  CPC ........... *H04N 7/185* (2013.01); *H04N 13/161* (2018.05); *H04N 13/194* (2018.05); *H04N 19/597* (2014.11); *H04N 5/28* (2013.01)

(56) References Cited

U.S. PATENT DOCUMENTS

| | | |
|---|---|---|
| 2014/0293014 A1 | 10/2014 | Gay et al. |
| 2015/0341540 A1 | 11/2015 | Kim et al. |
| 2015/0370250 A1 | 12/2015 | Bachrach et al. |
| 2015/0377405 A1* | 12/2015 | Down .................... B64C 39/024 73/865.8 |
| 2016/0016652 A1* | 1/2016 | Barrett ................. A63H 33/003 244/15 |
| 2016/0327950 A1* | 11/2016 | Bachrach ................... G06F 3/00 |
| 2017/0039765 A1* | 2/2017 | Zhou ..................... G06T 19/006 |
| 2017/0192418 A1* | 7/2017 | Bethke ................. G05D 1/0094 |
| 2017/0311127 A1* | 10/2017 | Murphy ................ G01S 5/0252 |

* cited by examiner

SYSTEMS AND METHODS FOR VIDEO PROCESSING AND DISPLAY

CROSS-REFERENCE TO RELATED APPLICATION

This application is a continuation of International Application No. PCT/CN2016/081292, filed on May 6, 2016, the entire contents of which are incorporated herein by reference.

BACKGROUND

User interfaces comprising first person view (FPV) images or video can provide an interactive and immersive user experience. For example, a user operating an unmanned aerial vehicle via a FPV may achieve an experience similar to that of flying the vehicle in the air. In some cases, FPV images or video can be rendered on a display device capable of displaying binocular stereoscopic video. The performance of presently known FPV display systems may be affected by various factors such as bandwidth transmission, video encoding/decoding process, video smoothing, stereoscopic display, etc. In some cases, jitter in the FPV images or video (e.g., caused by movements or vibrations of the camera) may adversely impact user experience by causing viewing discomfort to the user. The lack of a smooth FPV experience may reduce the usefulness of aerial vehicles in certain applications.

SUMMARY

A need exists for systems and methods that generate a smooth FPV user experience, that are intuitive and easy to use, and that allow a user to manage and operate a movable object through interaction with a human-system interface. The present disclosure addresses this need and provides related advantages as well.

In one aspect of the disclosure, a method for sensing an environment in which a movable object is configured to operate is provided. The method may comprise: with aid of one or more processors onboard the movable object individually or collectively: processing video data of the environment to obtain a predetermined visual effect, wherein the video data is collected using one or more imaging devices; encoding the video data to generate stereoscopic video data; and transmitting the stereoscopic video data to a terminal remote to the movable object. The predetermined visual effect may comprise smooth rendering of the video data with reduced jitter. The predetermined visual effect may improve a perceived quality of video playback.

A system for sensing an environment in which a movable object is configured to operate is provided in another aspect of the disclosure. The system may comprise: one or more imaging devices configured to collect video data of the environment; and one or more processors onboard the movable object individually or collectively configured to: (1) process the video data to obtain a predetermined visual effect, (2) encode the video data to generate stereoscopic video data, and (3) transmit the stereoscopic video data to a terminal remote to the movable object. The predetermined visual effect may comprise smooth rendering of the video data with reduced jitter. The predetermined visual effect may improve a perceived quality of video playback.

In another aspect of the disclosure, a non-transitory computer-readable medium is provided. The computer-readable medium may store instructions that, when executed, causes a computer to perform a method for sensing an environment in which a movable object is configured to operate. The method may comprise: processing video data of the environment to obtain a predetermined visual effect, wherein the video data is collected using one or more imaging devices; encoding the video data to generate stereoscopic video data; and transmitting the stereoscopic video data to a terminal remote to the movable object. The predetermined visual effect may comprise smooth rendering of the video data with reduced jitter. The predetermined visual effect may improve a perceived quality of video playback.

In another aspect of the disclosure, a method of processing video data of an environment is provided. The method may comprise: with aid of one or more processors individually or collectively: decoding stereoscopic video data to obtain video data of the environment, wherein said stereoscopic video data is transmitted from a movable object; processing the video data to obtain a predetermined visual effect; and transmitting the video data to a terminal for display. The predetermined visual effect may comprise smooth rendering of the video data with reduced jitter. The predetermined visual effect may improve a perceived quality of video playback.

An apparatus for processing video data of an environment is provided in another aspect of the disclosure. The apparatus may comprise one or more processors that are individually or collectively configured to: decode stereoscopic video data to obtain video data of the environment, wherein said stereoscopic video data is transmitted from a movable object; process the video data to obtain a predetermined visual effect; and transmit the video data to a terminal for display. The predetermined visual effect may comprise smooth rendering of the video data with reduced jitter. The predetermined visual effect may improve a perceived quality of video playback.

A non-transitory computer-readable medium is provided in another aspect of the disclosure. The computer-readable medium may store instructions that, when executed, causes a computer to perform a method for processing video data of an environment. The method may comprise: decoding stereoscopic video data to obtain video data of the environment, wherein said stereoscopic video data is transmitted from a movable object; processing the video data to obtain a predetermined visual effect; and transmitting the video data to a terminal for display. The predetermined visual effect may comprise smooth rendering of the video data with reduced jitter. The predetermined visual effect may improve a perceived quality of video playback.

In one aspect of the disclosure, a method for sensing an environment in which an unmanned aerial vehicle (UAV) is configured to operate is provided. The method may comprise obtaining, from one or more imaging devices onboard the UAV, raw video data of the environment. The method may also comprise encoding, with aid of one or more processors onboard the UAV individually or collectively, the raw video data to generate stereoscopic video data. The method may further comprise transmitting the stereoscopic video data to a device remote to the UAV. The device may be configured to display a first person view (FPV) of the environment based on the stereoscopic video data.

A system for sensing an environment in which an unmanned aerial vehicle (UAV) is configured to operate is provided in another aspect of the disclosure. The system may comprise one or more processors onboard the UAV individually or collectively configured to encode raw video data of the environment to generate stereoscopic video data. The raw video data may be obtained from one or more imaging devices onboard the UAV. The system may further comprise one or more communication units onboard the UAV individually or collectively configured to transmit the stereoscopic video data to a device remote to the UAV. The device may be configured to display a first person view (FPV) of the environment based on the stereoscopic video data.

In another aspect of the disclosure, a non-transitory computer-readable medium storing instructions that, when executed, causes a computer to perform a method for sensing an environment in which an unmanned aerial vehicle (UAV) is configured to operate is provided. The method performed by the computer may comprise obtaining, from one or more imaging devices onboard the UAV, raw video data of the environment. The method may also comprise encoding, with aid of one or more processors onboard the UAV individually or collectively, the raw video data to generate stereoscopic video data. The method may further comprise transmitting the stereoscopic video data to a device remote to the UAV. The device may be configured to display a first person view (FPV) of the environment based on the stereoscopic video data.

In some embodiments, the one or more processors onboard the UAV may comprise video codec processors for encoding the raw video data. The raw video data may be encoded using multi-ocular joint encoding. The multi-ocular joint encoding may comprise inter-frame prediction based on positional information of the one or more imaging devices. The multi-ocular joint encoding may comprise applying inter-frame prediction between multiple image views captured by the one or more imaging devices at a same moment. The multi-ocular joint encoding may comprise applying a Multiview Video Coding (MVC) format to the raw video data. Applying the MVC format may comprise (1) correlating the raw video data obtained by the one or more imaging devices, and (2) reducing information redundancy in the raw video data. In some cases, the multi-ocular joint encoding may comprise applying a High Efficiency Video Coding (HEVC) format to the raw video data. The raw video data may be encoded by the one or more processors substantially in or near real-time as the raw video data is being captured by the one or more imaging devices. The stereoscopic video data may be transmitted to the device using one or more communication units onboard the UAV. The stereoscopic video data may comprise high-definition stereoscopic video data. In some cases, the stereoscopic video data may comprise ultra high-definition stereoscopic video data. The stereoscopic video data may be transmitted to the device via a ground station. The ground station may be configured to decode the stereoscopic video data and transmit the decoded stereoscopic video data to the device. The device may be configured to display the FPV of the environment using the decoded stereoscopic video data. The device may comprise a head-mounted display (HMD). Alternatively, the device may comprise a pair of virtual reality (VR) or augmented reality (AR) enabled glasses. Additionally, the device may comprise a mobile device mounted onto a foldable headgear. The mobile device may have a graphical display configured to display the FPV. The device may allow a user to control and navigate the UAV from the first person view (FPV). Movement of the device may translate into a corresponding movement of the imaging device and/or the UAV.

In some embodiments, the imaging device may be a multi-ocular video camera operably coupled to the UAV. The multi-ocular video camera may be a binocular video camera mounted in a forward-looking direction of the UAV. A plurality of imaging devices may be operably coupled to different sides of the UAV. The plurality of imaging devices may be configured to capture raw video data of the environment surrounding the UAV. One or more imaging devices may be operably coupled to the UAV via a carrier comprising a multi-axis gimbal. The one or more imaging devices may be rotatably coupled to the UAV via the multi-axis gimbal.

According to another aspect of the disclosure, a method for processing video data of an environment is provided. The method may comprise: with aid of one or more processors individually or collectively: obtaining substantially in or near real-time a reference position of an imaging device located on a movable object based on one or more previously traversed positions of the imaging device. The one or more previously traversed positions may be obtained using at least one sensor on the movable object. The method may further comprise modifying an image frame in the video data based on (1) the reference position of the imaging device and (2) an actual position of the imaging device at which the image frame is taken.

An apparatus for processing video data of an environment may be provided in accordance with an additional aspect of the disclosure. The apparatus may comprise one or more processors that are individually or collectively configured to: obtain substantially in or near real-time a reference position of an imaging device located on a movable object based on one or more previously traversed positions of the imaging device, wherein the one or more previously traversed positions are obtained using at least one sensor on the movable object; and modify an image frame in the video data based on (1) the reference position of the imaging device and (2) an actual position of the imaging device at which the image frame is taken.

Further aspects of the disclosure may be directed to a non-transitory computer-readable medium storing instructions that, when executed, causes a computer to perform a method processing video data of an environment. The method performed by the computer may comprise: obtaining substantially in or near real-time a reference position of an imaging device located on a movable object based on one or more previously traversed positions of the imaging device, wherein the one or more previously traversed positions are obtained using at least one sensor on the movable object; and modifying an image frame in the video data based on (1) the reference position of the imaging device and (2) an actual position of the imaging device at which the image frame is taken.

In some embodiments, the reference position of the imaging device may be extrapolated or predicted based on the one or more previously traversed positions of the imaging device. The reference position of the imaging device may be configured to compensate for sudden or large movements in the imaging device. The sudden or large movements may be caused by motion of the movable object, motion of a carrier to which the imaging device is coupled, or external disturbances from the environment. At least one sensor may be located in an inertial measurement unit (IMU) operably coupled to the imaging device. The at least one sensor may comprise an accelerometer, a gyroscope, a compass, and/or a global positioning system (GPS) receiver. The at least one sensor may be configured to obtain position information, attitude information, and/or motion information of the imaging device. The video data may be obtained by encoding, with aid of one or more processors on the movable object individually or collectively, raw video data captured by the imaging device. The image frame in the video data may be modified using a transformation matrix. The transformation matrix may be calculated based on a change in motion characteristic between the image frame and a previous image frame. The change in motion characteristic may comprise a rotation or translation of the image frame relative to the previous image frame. The change in motion characteristic may be determined based on the actual position and a previously traversed position of the imaging device. The change in motion characteristic may be obtained using the at least one sensor on the movable object.

In some embodiments, the method may further comprise obtaining a plurality of reference positions of the imaging device, and generating a virtual motion path of the imaging device based on the plurality of reference positions. A plurality of reference positions may be obtained at different points in time while at least one of the imaging device or the movable object is in motion. In some cases, generating the virtual motion path may comprise filtering out one or more previously traversed positions that do not overlap with the reference positions. The virtual motion path may be generated substantially in or near real-time while at least one of the imaging device or the movable object is in motion.

The method may further comprise mapping the video data to the virtual motion path to obtain a predetermined visual effect. The video data may comprise a plurality of image frames that have been modified based on a plurality of reference positions of the imaging device. The mapping may comprise temporally stitching together a plurality of modified image frames to generate the stereoscopic video data. The stereoscopic video data may be mapped using a transformation matrix to generate continuous image frames.

A first person view (FPV) of the environment may be displayed on a device remote to the movable object based on the stereoscopic video data. The movable object may be an unmanned aerial vehicle. The device may comprise a head-mounted display (HMD). Alternatively, the device may comprise a pair of virtual reality (VR) or augmented reality (AR) enabled glasses. Additionally, the device may comprise a mobile device mounted onto a foldable headgear, said mobile device having a graphical display configured to display the FPV. The device may allow a user to control and navigate the movable object from the first person view (FPV). Movement of the device may translate into a corresponding movement of the imaging device and/or the movable object.

The imaging device may be a multi-ocular video camera operably coupled to the movable object. The multi-ocular video camera may be a binocular video camera mounted in a forward-looking direction of the movable object. In some embodiments, a plurality of imaging devices may be operably coupled to different sides of the movable object. The plurality of imaging devices may be configured to capture raw video data of the environment surrounding the movable object. The imaging device may be operably coupled to the movable object via a carrier comprising a multi-axis gimbal. The imaging device may be rotatably coupled to the movable object via the multi-axis gimbal.

According to another aspect of the disclosure, a method for smoothing video data of an environment is provided. The method may comprise: with aid of one or more processors individually or collectively: generating a virtual motion path of an imaging device based on positional information of said imaging device, wherein said imaging device is located on a movable object and said positional information is obtained using one or more sensors on the movable object; and mapping the video data to the virtual motion path to obtain a predetermined visual effect, wherein the video data comprises a plurality of image frames that have been modified based on a plurality of reference positions of the imaging device. An apparatus for smoothing video data of an environment may be provided in accordance with an additional aspect of the disclosure. The apparatus may comprise one or more processors that are individually or collectively configured to: generate a virtual motion path of an imaging device based on positional information of said imaging device, wherein said imaging device is located on a movable object and said positional information is obtained using one or more sensors on the movable object; and map the video data to the virtual motion path to obtain a predetermined visual effect, wherein the video data comprises a plurality of image frames that have been modified based on a plurality of reference positions of the imaging device.

A further aspect of the disclosure may be directed to a non-transitory computer-readable medium storing instructions that, when executed, causes a computer to perform a method for smoothing video data of an environment. The method may comprise: generating a virtual motion path of an imaging device based on positional information of said imaging device, wherein said imaging device is located on a movable object and said positional information is obtained using one or more sensors on the movable object; and mapping the video data to the virtual motion path to obtain a predetermined visual effect, wherein the video data comprises a plurality of image frames that have been modified based on a plurality of reference positions of the imaging device.

The positional information of the imaging device may comprise attitude information including a pitch angle, a yaw angle, and/or a roll angle of the imaging device relative to a reference frame. The positional information of the imaging device may also comprise position information including latitude coordinates, longitude coordinates, elevation, altitude, and/or a displacement of the imaging device. The positional information of the imaging device may further comprise motion information including a linear velocity, linear acceleration, angular velocity, and/or angular acceleration of the imaging device. The one or more sensors may comprise an accelerometer, a gyroscope, a compass, and/or a global positioning system (GPS) receiver. The one or more sensors may be located in an inertial measurement unit (IMU) that is operably coupled to the imaging device and configured to measure the positional information of the imaging device. Generating the virtual motion path may comprise applying a filter to the positional information of the imaging device. The filter may comprise a low-order filter and/or a higher-order filter. The virtual motion path may be represented by a polynomial time-based function. The virtual motion path may be generated substantially in or near real-time while the imaging device and/or the movable object are in motion.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The systems, methods, and devices disclosed herein can improve user experience during operation of movable objects such as unmanned aerial vehicles (UAVs). A display device as described herein may be configured to display a FPV of an environment based on stereoscopic video data transmitted from a movable object (e.g., a UAV) to the display device. The stereoscopic video data may be generated by encoding raw video data of the environment using one or more processors onboard or offboard the movable object. The raw video data of the environment may be obtained from one or more imaging devices onboard the movable object. The raw video data may comprise images and/or videos captured from a plurality of different views by the one or more imaging devices.

The display device may include a wearable device. For example, the display device may be configured to be worn by a user. In some cases, the display device may be a pair of glasses, goggles, or a head-mounted display. The display device may include any type of wearable computer or device incorporating augmented reality (AR) or virtual reality (VR) technology. AR and VR involve computer-generated graphical interfaces that provide new ways for users to experience content. In augmented reality (AR), a computer-generated graphical interface may be superimposed over real world video or images on a display device. In virtual reality (VR), a user may be immersed in a computer-generated environment rendered on a display device. The display device provided herein may be configured to display a FPV of the real world environment from the movable object, in an AR setting or VR setting.

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

Figure 1:
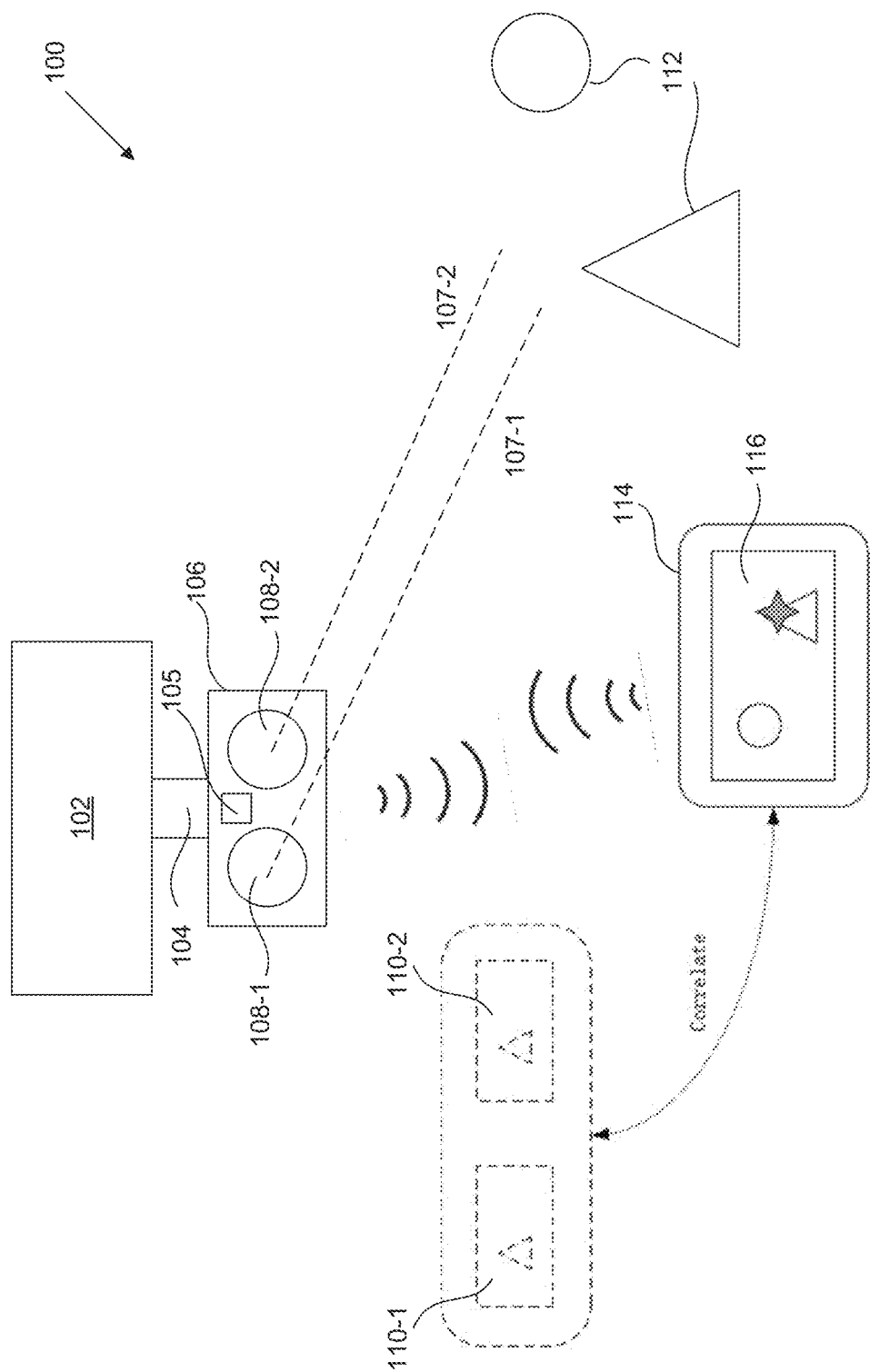
FIG. 1 shows a system for displaying a first person view (FPV) of an environment in accordance with some embodiments.

FIG. 1 shows a system for displaying a first person view (FPV) of an environment in accordance with some embodiments. A FPV visual navigation system 100 may comprise a movable object 102 and a user terminal 114 capable of communicating with the movable object. The user terminal may include a display device. In some embodiments, the display device may include a head-mounted display (HMD), or a pair of virtual reality (VR) or augmented reality (AR) enabled glasses. In some instances, the display device may comprise a mobile device mounted onto a foldable headgear. The mobile device may comprise a graphical display configured to display a FPV of the environment.

The display device may be configured to receive stereoscopic video data transmitted from the movable object, and display a FPV 116 of the environment based on the stereoscopic video data. The user terminal can be used to control one or more motion characteristics of the movable object and/or a payload supported by the movable object. For example, a user can use the user terminal to visually navigate and control operation (e.g., movement) of the movable object and/or one or more imaging devices onboard the movable object, based on the FPV of the environment. In some cases, the display device may be a pair of glasses or a head-mounted display worn on a user's head. In those cases, the user's head movement of the display device and/or eye movement may effect a corresponding movement of the imaging devices and/or movable object.

The movable object may be any object capable of traversing the environment. The movable object may be capable of traversing air, water, land, and/or space. The environment may include objects that are incapable of motion (stationary objects) and objects that are capable of motion. Examples of stationary objects may include geographic features, plants, landmarks, buildings, monolithic structures, or any fixed structures. Examples of objects that are capable of motion include people, vehicles, animals, projectiles, etc.

In some cases, the environment may be an inertial reference frame. The inertial reference frame may be used to describe time and space homogeneously, isotropically, and in a time-independent manner. The inertial reference frame may be established relative to the movable object, and move in accordance with the movable object. Measurements in the inertial reference frame can be converted to measurements in another reference frame (e.g., a global reference frame) by a transformation (e.g., Galilean transformation in Newtonian physics).

The movable object may be a vehicle. The vehicle may be a self-propelled vehicle. The vehicle may traverse the environment with aid of one or more propulsion units. The vehicle may be an aerial vehicle, a land-based vehicle, a water-based vehicle, or a space-based vehicle. The vehicle may be an unmanned vehicle. The vehicle may be capable of traversing the environment without a human passenger onboard. Alternatively, the vehicle may carry a human passenger. In some embodiments, the movable object may be an unmanned aerial vehicle (UAV). Any description herein of a UAV or any other type of movable object may apply to any other type of movable object or various categories of movable objects in general, or vice versa. For instance, any description herein of a UAV may apply to any unmanned land-bound, water-based, or space-based vehicle. Further examples of movable objects are provided in greater detail elsewhere herein.

As mentioned above, the movable object may be capable of traversing an environment. The movable object may be capable of flight within three dimensions. The movable object may be capable of spatial translation along one, two, or three axes. The one, two or three axes may be orthogonal to one another. The axes may be along a pitch, yaw, and/or roll axis. The movable object may be capable of rotation about one, two, or three axes. The one, two, or three axes may be orthogonal to one another. The axes may be a pitch, yaw, and/or roll axis. The movable object may be capable of movement along up to 6 degrees of freedom. The movable object may include one or more propulsion units that may aid the movable object in movement. For instance, the movable object may be a UAV with one, two or more propulsion units. The propulsion units may be configured to generate lift for the UAV. The propulsion units may include rotors. The movable object may be a multi-rotor UAV.

The movable object may have any physical configuration. For instance, the movable object may have a central body with one or arms or branches extending from the central body. The arms may extend laterally or radially from the central body. The arms may be movable relative to the central body or may be stationary relative to the central body. The arms may support one or more propulsion units. For instance, each arm may support one, two or more propulsion units.

The movable object may have a housing. The housing may be formed from a single integral piece, two integral pieces, or multiple pieces. The housing may include a cavity within where one or more components are disposed. The components may be electrical components, such as a flight controller, one or more processors, one or more memory storage units, one or more sensors (e.g., one or more inertial sensors or any other type of sensor described elsewhere herein), one or more navigational units (e.g., a global positioning system (GPS) unit), one or communication units, or any other type of component. The housing may have a single cavity or multiple cavities. In some instances, a flight controller may in communication with one or more propulsion units and/or may control operation of the one or more propulsion units. The flight controller may communicate and/or control operation of the one or more propulsion units with aid of one or more electronic speed control (ESC) modules. The flight controller may communicate with the ESC modules to control operation of the propulsion units.

The movable object may be configured to support an onboard payload 106. The payload may have a fixed position relative to the movable object, or may be movable relative to the movable object. The payload may spatially translate relative to the movable object. For instance, the payload may move along one, two or three axes relative to the movable object. The payload may rotate relative to the movable object. For instance, the payload may rotate about one, two or three axes relative to the movable object. The axes may be orthogonal to on another. The axes may be a pitch, yaw, and/or roll axis. Alternatively, the payload may be fixed or integrated into the movable object.

The payload may be movable relative to the movable object with aid of a carrier 104. The carrier may include one or more gimbal stages that may permit movement of the carrier relative to the movable object. For instance, the carrier may include a first gimbal stage that may permit rotation of the carrier relative to the movable object about a first axis, a second gimbal stage that may permit rotation of the carrier relative to the movable object about a second axis, and/or a third gimbal stage that may permit rotation of the carrier relative to the movable object about a third axis. Any descriptions and/or characteristics of carriers as described elsewhere herein may apply.

The payload may include a device capable of sensing the environment about the movable object, a device capable of emitting a signal into the environment, and/or a device capable of interacting with the environment. One or more sensors may be provided as a payload, and may be capable of sensing the environment. The one or more sensors may include an imaging device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images.

A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

In some embodiments, the payload may include multiple imaging devices, or an imaging device with multiple lenses and/or image sensors. The payload may be capable of taking multiple images substantially simultaneously, sequentially, or at different points in time. The multiple images may aid in the creation of a 3D scene, a 3D virtual environment, a 3D map, or a 3D model. For instance, a right-eye image and a left-eye image may be taken and used for stereo-mapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

In FIG. 1, the payload may include an imaging device. In some embodiments, the imaging device may comprise a first imaging device 108-1 and a second imaging device 108-2. Any number of imaging devices may be contemplated, for example, 1 to n imaging devices, where n is an integer. In some embodiments, the first and second imaging devices may be part of a multi-ocular video camera. The multi-ocular video camera may be mounted in a forward-looking direction of the movable object. Alternatively, the multi-ocular video camera may be mounted in any direction of the movable object (e.g., rear-looking, side-looking, top-looking, or bottom-looking). The multi-ocular video camera may be operably coupled to the movable object via the carrier 104. The carrier may comprise a multi-axis gimbal. The multi-ocular video camera may be rotatably coupled to the movable object via the multi-axis gimbal. In some cases, the multi-ocular video camera may be a binocular video camera.

The first imaging device and the second imaging device may be disposed at different locations relative to each other such that the first imaging device and the second imaging device have different optical axes. For example, the first imaging device may have a first optical axis 107-1 and the second imaging device may have a second optical axis 107-2. The first imaging device and the second imaging device may belong to a same inertial reference frame. Alternatively, the first imaging device and the second imaging device may belong to different inertial reference frames that move independently of each other (not shown).

The first imaging device may be configured to capture a first image 110-1 and the second imaging device may be configured to capture a second image 110-2. In some instances, the first and second images may respectively correspond to a left-eye image and a right-eye image. The left-eye image and the right-eye image may collectively form a binocular image. The left-eye image and the right-eye image may comprise images of objects 112 in the environment. The positions of the objects in the captured images may be slightly different due to binocular vision, since the first imaging device and the second imaging device are at different locations (having different optical axes).

An inertial measurement unit (IMU) 105 may be disposed on the payload, for example on the first and/or second imaging devices. Alternatively, the IMU may be disposed on the carrier that couples the payload to the movable object. The IMU can be configured to obtain real-time positional information of the first imaging device and the second imaging device. The real-time positional information from the IMU may be indicative of the actual positions of the first and second imaging devices, since the IMU is mounted on the payload.

Figure 2:
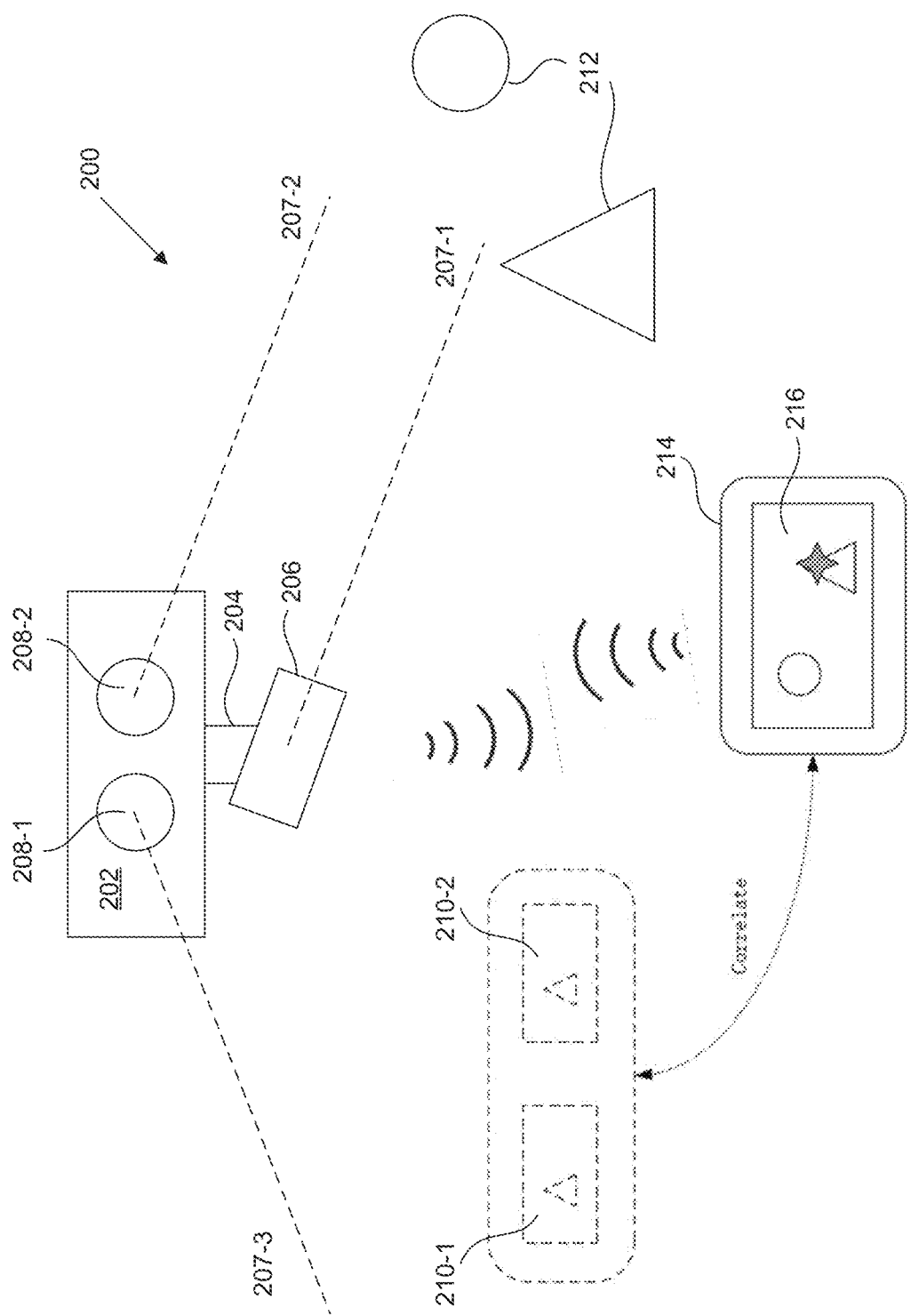
FIG. 2 shows a system for displaying a FPV of an environment in accordance with some other embodiments.

In some embodiments, a multi-ocular video camera may be located in a body of the movable object, instead of being supported by a carrier operably coupled to the movable object. Another camera may also be included in addition to the multi-ocular video camera. For example as shown in FIG. 2, a first imaging device 206 may be a payload carried by a movable object 202, and a second imaging device 208 may be located on or within a body of the movable object. In FIG. 2, the first imaging device may be a camera and the second imaging device may be a binocular vision sensor. The binocular vision sensor may comprise a first vision sensor 208-1 and a second vision sensor 208-2. A first IMU may be disposed on the payload, for example on the first imaging device itself, or on a carrier that couples the payload to the movable object. A second IMU may be located within a body of the movable object. In the example of FIG. 2, the images captured by the first imaging device may be presented in a FPV 216 on a user terminal 214, and the binocular images captured by the second imaging device may be used for generating depth map information of the environment. The depth map information may be obtained in part using left-eye image 210-1 and right-eye image 210-2 captured respectively by the first vision sensor and the second vision sensor. The left-eye image and the right-eye image may collectively form a binocular image. The left-eye image and the right-eye image may comprise images of objects 212 in the environment.

In FIG. 2, the first imaging device 206 and the second imaging device 208 may be disposed at different locations relative to each other such that the first imaging device and the second imaging device have different optical axes. For example, the first imaging device 206 may have a first optical axis 207-1, and the second imaging device 208 may have a plurality of optical axes 207-2 and 207-3. The optical axes 207-1, 207-2, and 207-3 may extend in a same direction or in different directions.

The first imaging device 206 and the second imaging device 208 may belong to different inertial reference frames that move independently of each other. For example, the first imaging device 206 may belong to a first inertial reference frame defined with respect to a carrier 204 that couples the first imaging device to a body of the movable object 202. The second imaging device 208 may belong to a second inertial reference frame defined with respect to the body of the movable object 202. The carrier 204 may be capable of rotating about one or more axes, such that the first inertial reference frame and the second inertial reference frame can move independently of each other.

An imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the imaging device may be a 4K camera or a camera with a higher resolution.

The imaging device may capture a sequence of images at a specific capture rate. In some embodiments, the sequence of images may be captured standard video frame rates such as about 24 p, 25 p, 30 p, 48 p, 50 p, 60 p, 72 p, 90 p, 100 p, 120 p, 300 p, 50 i, or 60 i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

A payload may include one or more types of sensors. Some examples of types of sensors may include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

Any examples herein of payloads may apply to devices that may be carried by the movable object or that may be part of the movable object. For instance, one or more sensors may be part of the movable object. The one or more sensors may or may be provided in addition to the payload. This may apply for any type of payload, such as those described herein.

The movable object may be capable of communicating with the user terminal. The user terminal may communicate with the movable object itself, with a payload of the movable object, and/or with a carrier of the movable object, whereby the carrier is used to support the payload. Any description herein of communications with the movable object may also apply to communications with the payload of the movable object, the carrier of the movable object, and/or one or more individual components of the movable object (e.g., communication unit, navigation unit, propulsion units, power source, processors, memory storage units, and/or actuators).

The communications between the movable object and the user terminal may be wireless communications. Direct communications may be provided between the movable object and the user terminal. The direct communications may occur without requiring any intermediary device or network. Indirect communications may be provided between the movable object and the user terminal. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof.

The user terminal may be any type of external device. Examples of user terminals may include, but are not limited to, smartphones/cellphones, tablets, personal digital assistants (PDAs), laptop computers, desktop computers, media content players, video gaming station/system, virtual reality systems, augmented reality systems, wearable devices (e.g., watches, glasses, gloves, headgear (such as hats, helmets, virtual reality headsets, augmented reality headsets, head-mounted devices (HMD), headbands), pendants, armbands, leg bands, shoes, vests), gesture-recognition devices, microphones, any electronic device capable of providing or rendering image data, or any other type of device. The user terminal may be a handheld object. The user terminal may be portable. The user terminal may be carried by a human user. The user terminal may be worn by a human user. In some cases, the user terminal may be located remotely from a human user, and the user can control the user terminal using wireless and/or wired communications. Various examples, and/or characteristics of user terminal are provided in greater detail elsewhere herein.

A user terminal may include one or more processors that may be capable of executing non-transitory computer readable media that may provide instructions for one or more actions. The user terminal may include one or more memory storage devices comprising non-transitory computer readable media including code, logic, or instructions for performing the one or more actions. The user terminal may include software applications that allow the user terminal to communicate with and receive imaging data from a movable object. The user terminal may include a communication unit, which may permit the communications with the movable object. In some instances, the communication unit may include a single communication module, or multiple communication modules. In some instances, the user terminal may be capable of interacting with the movable object using a single communication link or multiple different types of communication links.

The user terminal may include a display (or display device). The display may be a screen. The display may or may not be a touchscreen. The display may be a light-emitting diode (LED) screen, OLED screen, liquid crystal display (LCD) screen, plasma screen, or any other type of screen. The display may be configured to show a graphical user interface (GUI). The GUI may show an image that may permit a user to control actions of the UAV. In some instances, the user may select a target from the image. The target may be a stationary target or a moving target. In other instances, the user may select a direction of travel from the image. The user may select a portion of the image (e.g., point, region, and/or object) to define the target and/or direction. The user may select the target and/or direction by changing the focus and/or direction of the user's gaze point on the screen (e.g., based on eye-tracking of the user's regions of interest). In some cases, the user may select the target and/or direction by moving his or her head in different directions and manners.

A user may touch a portion of the screen. The user may touch the portion of the screen by touching a point on the screen. Alternatively, the user may select a region on a screen from a pre-existing set of regions, or may draw a boundary for a region, a diameter of a region, or specify a portion of the screen in any other way. The user may select the target and/or direction by selecting the portion of the image with aid of a user interactive device (e.g., mouse, joystick, keyboard, trackball, touchpad, button, verbal commands, gesture-recognition, attitude sensor, thermal sensor, touch-capacitive sensors, or any other device). A touchscreen may be configured to detect location of the user's touch, length of touch, pressure of touch, and/or touch motion, whereby each of the aforementioned manner of touch may be indicative of a specific input command from the user.

The image on the display may show a view collected with aid of a payload of the movable object. For instance, an image collected by the imaging device may be shown on the display. This may be considered a first person view (FPV). In some instances, a single imaging device may be provided and a single FPV may be provided. Alternatively, multiple imaging devices having different fields of view may be provided. The views may be toggled between the multiple FPVs, or the multiple FPVs may be shown simultaneously. The multiple FPVs may correspond to (or can be generated by) different imaging devices, which may have different field of views. A user may use the user terminal to select a portion of the image collected by the imaging device to specify a target and/or direction of motion by the movable object.

In another example, the image on the display may show a map that may be generated with aid of information from a payload of the movable object. The map may optionally be generated with aid of multiple imaging devices (e.g., right camera, left camera, or more cameras), which may utilize stereo-mapping techniques. In some instances, the map may be generated based on positional information about the UAV relative to the environment, the imaging device relative to the environment, and/or the UAV relative to the imaging device. Positional information may include posture information, spatial location information, angular velocity, linear velocity, angular acceleration, and/or linear acceleration. The map may be optionally generated with aid of one or more additional sensors, as described in greater detail elsewhere herein. The map may be a two-dimensional map or a three-dimensional map. The views may be toggled between a two-dimensional and a three-dimensional map view, or the two-dimensional and three-dimensional map views may be shown simultaneously. A user may use the user terminal to select a portion of the map to specify a target and/or direction of motion by the movable object. The views may be toggled between one or more FPV and one or more map view, or the one or more FPV and one or more map view may be shown simultaneously. The user may make a selection of a target or direction using any of the views. The portion selected by the user may include the target and/or direction. The user may select the portion using any of the selection techniques as described.

In some embodiments, the image data may be provided in a 3D virtual environment that is displayed on the user terminal (e.g., virtual reality system or augmented reality system). The 3D virtual environment may optionally correspond to a 3D map. The virtual environment may comprise a plurality of points or objects that can be manipulated by a user. The user can manipulate the points or objects through a variety of different actions in the virtual environment. Examples of those actions may include selecting one or more points or objects, drag-and-drop, translate, rotate, spin, push, pull, zoom-in, zoom-out, etc. Any type of movement action of the points or objects in a three-dimensional virtual space may be contemplated. A user may use the user terminal to manipulate the points or objects in the virtual environment to control a flight path of the UAV and/or motion characteristic(s) of the UAV. A user may also use the user terminal to manipulate the points or objects in the virtual environment to control motion characteristic(s) and/or different functions of the imaging device.

For example, in some embodiments, a user may use the user terminal to implement target-pointing flight. The user may select one or more points on an image displayed on the user terminal. The image may be provided in a GUI rendered on the output device of the user terminal. When the user selects the one or more points, the selection may extend to a target associated with that point. In some cases, the selection may extend to a portion of the target. The point may be located on or proximate to the target in the image. The UAV may then fly towards and/or track the target. For example, the UAV may fly to a predetermined distance, position, and/or orientation relative to the target. In some instances, the UAV may track the target by following it at the predetermined distance, position, and/or orientation. The UAV may continue to move towards the target, track the target, or hover at the predetermined distance, position, and/or orientation to the target, until a new target instruction is received at the user terminal. A new target instruction may be received when the user selects another different one or more points on the image. When the user selects the different one or more points, the target selection may switch from the original target to a new target that is associated with the new one or more points. The UAV may then change its flight path and fly towards and/or track the new target.

In some other embodiments, a user may use the user terminal to implement direction-pointing flight. A user may select a point on an image displayed on the user terminal. The image may be provided in a GUI rendered on the output device of the user terminal. When the user selects the point, the selection may extend to a target direction associated with that point. The UAV may then fly in the direction. The UAV may continue to move in the direction until a countermanding condition is detected. For instance, the UAV may fly in the target direction until a new target direction instruction is received at the user terminal. A new target direction instruction may be received when the user selects another different point on the image. When the user selects a different point, the target direction selection may switch from the original direction to a new target direction that is associated with the new point. The UAV may then change its flight path and fly in the new target direction.

The user terminal may be used to control the movement of the movable object, such as the flight of an UAV. The user terminal may permit a user to manually directly control flight of the movable object. Alternatively, a separate device may be provided that may allow a user to manually directly control flight of the movable object. The separate device may or may not be in communication with the user terminal. The flight of the movable object may optionally be fully autonomous or semi-autonomous. The user terminal may optionally be used to control any component of the movable object (e.g., operation of the payload, operation of the carrier, one or more sensors, communications, navigation, landing stand, actuation of one or more components, power supply control, or any other function). Alternatively, a separate device may be used to control one or more components of the movable object. The separate device may or may not be in communication with the user terminal. One or more components may be controlled automatically with aid of one or more processors.

In some instances, a direction of travel of the movable object may be selected by the user. The movable object may travel in the direction selected by the user. The direction may be selected by a user selecting a portion of an image (e.g., in FPV or map view). The movable object may travel in the selected direction until a countermanding instruction is received or when a countermanding condition is realized. For instance, the movable object may automatically travel in the selected direction until a new direction is input, or a new target is input. The movable object may travel in the selected direction until a different flight mode is selected. For instance, the user may take manual control over the flight of the movable object.

Figure 3:
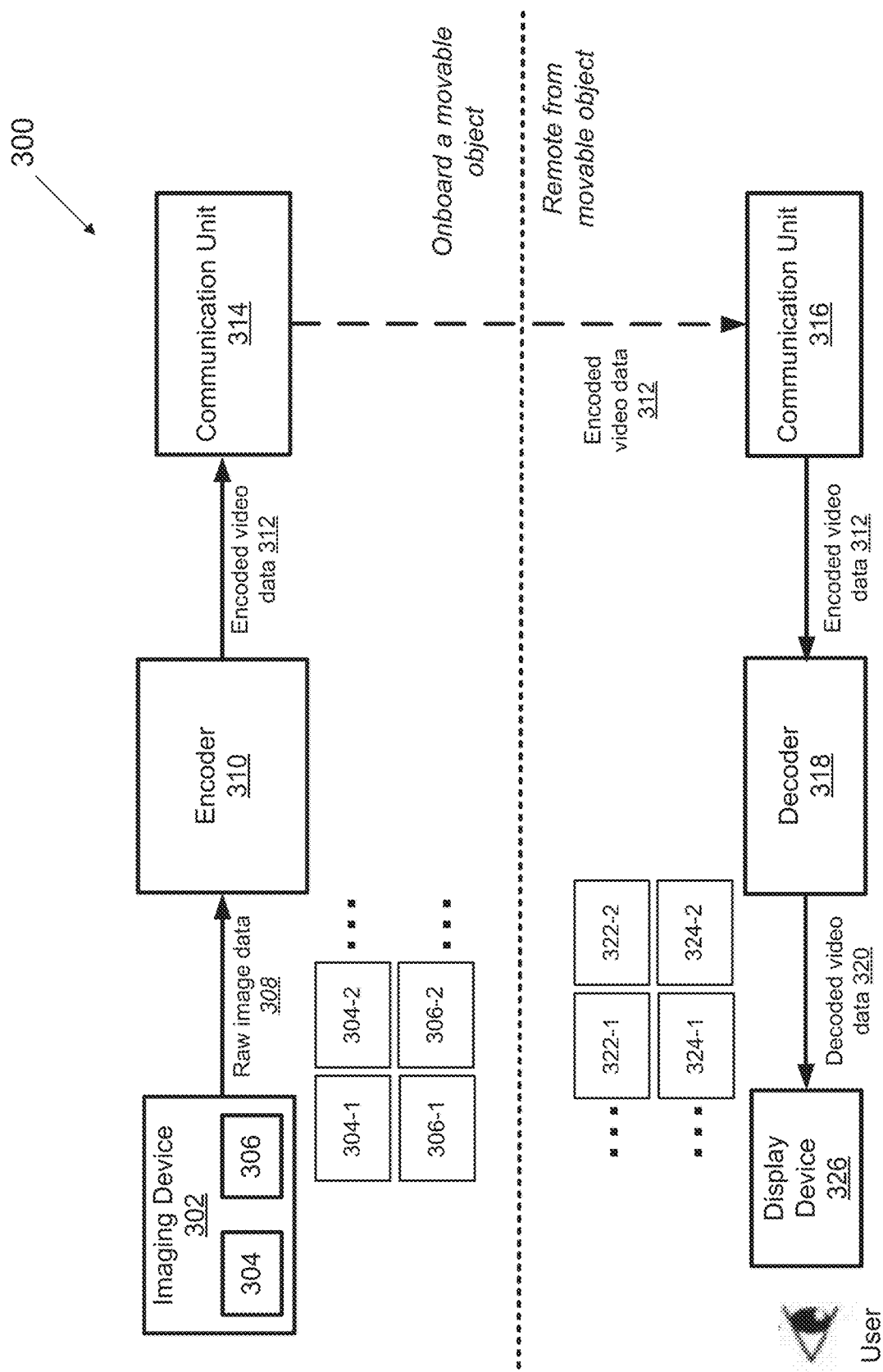
FIG. 3 shows a block diagram illustrating examples of components for processing images and/or video data to generate stereoscopic video data, in accordance with embodiments.

FIG. 3 shows a block diagram 300 illustrating examples of components for processing images and/or video data to generate stereoscopic video data, in accordance with embodiments. The stereoscopic video data may be displayed on a user terminal in a FPV, for example as shown in FIGS. 1 and 2. The components may comprise a first group of components located onboard a movable object, and a second group of components located remotely from the movable object. In some embodiments, one or more components from the second group of components may be located on a user terminal.

The first group of components may comprise an imaging device 302, an encoder 310, and a communication unit 314. The imaging device may be operably coupled to the movable object via a carrier. Optionally, the imaging device may be disposed within a housing of the movable object. In some alternative embodiments (not shown), the imaging device may be implemented as a stand-alone device and need not be provided on a movable object. An inertial measurement unit (IMU) (not shown) may be mounted on the imaging device, or on the carrier to which the imaging device is coupled. The encoder may be implemented using one or more processors onboard the movable object. The one or more processors onboard the UAV may include video codec processors for encoding raw image data 308. Raw image data as used herein may include raw video data. The encoder as used herein may include a video encoder. The communication unit 314 may be located within a body of the movable object. The communication unit 314 may include one or more processors configured to transmit encoded video data 312 from the movable object directly or indirectly to the user terminal.

In some embodiments, the imaging device 302, encoder 310, and the communication unit 314 may be mounted or co-located on the movable object, such as a vehicle that is capable of traveling in the air, on land, on water, or within a water body. Examples of vehicles may include an aerial vehicle (e.g., UAVs, airplanes, rotor-craft, lighter-than air vehicles), a land-bound vehicle (e.g., cars, trucks, buses, trains, rovers, subways), a water-bound vehicle (e.g., boats, ships, submarines), or space-based vehicles (e.g., satellites, shuttles, rockets). A movable object may be capable of traversing on land or underground, on or in the water, within the air, within space, or any combination thereof. In some embodiments, the movable object may be a mobile device, a cell phone or smartphone, a personal digital assistant (PDA), a computer, a laptop, a tablet PC, a media content player, a video game station/system, wearable devices such as a virtual reality headset or a head mounted device (HMD), or any electronic device capable of capturing, providing or rendering image data, and/or identifying or tracking a target object based on the image data. The movable object may be self-propelled, can be stationary or moving, and may change orientation (e.g., attitude) over time.

The imaging device 302 may serve as an image capture device as described elsewhere herein. The imaging device may be configured to raw capture image data of one or more objects. The raw image data may correspond to, for example, still images or video frames of the plurality of objects. The objects may include any physical object or structure that can be optically identified and/or tracked in real-time by the visual tracking system. Optical tracking has several advantages. For example, optical tracking allows for wireless 'sensors', is less susceptible to noise, and allows for many objects (e.g., different types of objects) to be tracked simultaneously. The objects can be depicted in still images and/or video frames in a 2D or 3D format, can be real-life and/or animated, can be in color, black/white, or grayscale, and can be in any color space. The objects may be stationary. Alternatively, the objects may be movable and may be moving or stationary at any given point in time.

The imaging device 302 may be configured to obtain raw image data 308 of an environment in which the movable object is configured to operate. As shown in FIG. 3, the imaging device may transmit the raw image data 308 to the encoder 310 to be processed (encoded) into encoded video data 312. The encoder may be a stand-alone device borne by the movable object or a component of the imaging device. Optionally, the encoder may be off-board the UAV. In some embodiments, the raw image data and the encoded video data may comprise a plurality of color images, and the plurality of pixels may comprise color pixels. In other embodiments, the raw image data and the encoded video data may comprise a plurality of grayscale images, and the plurality of pixels may comprise grayscale pixels. In some embodiments, each pixel in the plurality of grayscale images may have a normalized grayscale value.

The encoder may be configured to compress the digital signals in the raw image data 308, in an attempt to reduce the size of the data without significant adverse effects on the perceived quality of the image. The data compression may comprise image compression and/or video compression. The data compression may include encoding information using fewer bits than the original format. The data compression can be lossy or lossless. Lossless compression may reduce bits by identifying and eliminating statistical redundancy. No information is lost in lossless compression. Lossy compression may reduce bits by identifying certain information and removing/truncating it. This data compression is especially advantageous when the bandwidth for data transmission between the movable object and a user terminal is limited. The data compression can also be desirable for saving resource usage, such as data storage space. For example, JPEG image compression may round off nonessential bits of information to obtain trade-off between preserving information and reducing size. MPEG compression may further add inter-frame encoding to take advantage of the similarity of consecutive frames in a motion sequence.

The compression quality may include a quantization parameter (QP) value which is achieved by compressing a range of values to a single quantum value. For example, QP value may be used to reduce the number of colors used in an image. QP value may also be used to reduce the information from high frequency components of image data. In some instances, a higher QP value may indicate a higher compression rate applied to the image data which results in bigger data loss, and a lower QP value may indicate a lower compression rate applied to the image data which results in smaller data loss. After compression, the image data compressed using a higher QP value may have lower resolution, lower brightness, lower contrast, less detailed color information, and/or losing other image qualities. On the other hand, the image data compressed using a lower QP value may have higher resolution, higher image brightness, higher image contrast, more detailed color information, and/or other enhanced image qualities. Other suitable compression methods and algorithms may also be used.

In some embodiments, the encoder may be configured to process raw video data, by encoding the raw video data of the environment to generate stereoscopic video data onboard the movable object. The stereoscopic video data may be generated by fusing together multiple image views in the raw video data. In some embodiments, the raw video data may be encoded using multi-ocular joint encoding. The multi-ocular joint encoding may comprise inter-frame prediction based on positional information of the imaging device. The positional information of the imaging device may be obtained from an IMU. The multi-ocular joint encoding may comprise applying inter-frame prediction between multiple image views captured by the imaging device at a same moment or at different moments. In some embodiments, the imaging device 302 may comprise a plurality of imaging devices configured to capture multiple image views. For example, the imaging device 302 may comprise a first imaging device 304 configured to capture a plurality of images 304-1, 304-2, and so forth. The imaging device 302 may further comprise a second imaging device 306 configured to capture a plurality of images 306-1, 306-2, and so forth. The plurality of images 304-1, 304-2, 306-1, and 306-2 may correspond to multiple image views that are taken by the first and second imaging devices from different angles/positions, and/or at a same or different time instances. The multiple image views may be provided in the form of raw image data 308 to the encoder 310. An IMU may be configured to concurrently obtain positional information of the imaging device 302 (e.g., positional information of the first and second imaging devices 304 and 306) at each time instance that an image is being captured. For example, the IMU may obtain positional information of the first imaging device 304 at time t1 corresponding to when the image 304-1 is captured. Similarly, the IMU may obtain positional information of the second imaging device 306 at time t1' corresponding to when the image 306-1 is captured. The times t1 and t1' may be a same or different points in time. The encoder 310 may be configured to encode the raw image data 308 using multi-ocular joint encoding. The multi-ocular joint encoding as described herein may comprise inter-frame prediction of the plurality of images based on positional information of the imaging device(s) at each time instance that an image is captured.

The raw image data may include raw video data of multiple image views captured at different moments in time. In some embodiments, the multi-ocular joint encoding may comprise applying a Multiview Video Coding (MVC) format to the raw video data. For example, the encoder 310 may be configured to apply the MVC format to the raw video data. Applying the MVC format may comprise (1) correlating the raw video data obtained by the imaging device(s), and (2) reducing information redundancy in the raw video data. In some other embodiments, the multi-ocular joint encoding may comprise applying a High Efficiency Video Coding (HEVC) format to the raw video data. In some embodiments, the raw video data may be encoded by the one or more processors in the encoder 310 substantially in or near real-time as the raw video data is being captured by the imaging device(s).

The communication unit 314 onboard the movable object may be configured to transmit the encoded video data 312 (comprising onboard-generated stereoscopic video data) to a communication unit 316 remote from the movable object. The communication unit 316 may or may not be located at a user terminal. The user terminal may or may not be located on the ground. The user terminal may be located remotely from the movable object. In some instances, the communication unit 316 may be located at a ground station in communication with the movable object and the user terminal. The user terminal and the movable object may be in communication with each other via the communication units 314 and 316. The encoded video data 312 may be transmitted from the movable object to the user terminal via a downlink. The user terminal may transmit various control signals (not shown) to the movable object via an uplink. Each of the uplink and the downlink may be wireless link. The wireless link may include a RF (radio frequency) link, a Wi-Fi link, a Bluetooth link, a 3G link, or a LTE link. The wireless link may be used for transmission of image data or control data over long distances. For example, the wireless link may be used over distances equal to or greater than about 5 m, 10 m, 15 m, 20 m, 25 m, 50 m, 100 m, 150 m, 200 m, 250 m, 300 m, 400 m, 500 m, 750 m, 1000 m, 1250 m, 1500 m, 1750 m, 2000 m, 2500 m, 3000 m, 3500 m, 4000 m, 4500 m, 5000 m, 6000 m, 7000 m, 8000 m, 9000 m, or 10000 m. In some cases, the communication unit 314 may be a component of the imaging device and/or the encoder. For example, the imaging device and/or the encoder may comprise one or more transceivers. In some cases, the communication unit 316 may be a component of the display device and/or a decoder.

The bandwidth of the communication between the movable object and the user terminal (between the first and second communication units 314 and 316) may be in a range from about 10 Kbps to about 1 M bps. Different image data compression strategies may be used depending on the current or available communication bandwidth. For example, whole images may be compressed uniformly when the communication bandwidth is fast enough to support realtime image transmission. However, when the communication bandwidth drops to a certain level, it may be switched to a different image compression strategy where different images are selectively compressed at different rates. In some embodiments, the encoded video data 312 may comprise high-definition stereoscopic video data. In other embodiments, the processed video data 312 may comprise ultra high-definition stereoscopic video data.

The communication unit 316 may in turn transmit the encoded video data 312 to a decoder 318. The decoder may be a video decoder, or may comprise a video decoder. The decoder may be implemented using one or more processors at a user terminal and/or at a ground station. In some cases, the decoder may be implemented on a display device 326. The decoder may be configured to decompress the processed image data processed by the encoder. The decoder may be configured to decode the encoded video data 312 to retrieve the stereoscopic video data, and transmit the stereoscopic video data to the display device 326. The stereoscopic video data may comprise a plurality of left-eye images 322-1 and 322-2 and a plurality of right-eye images 324-1 and 324-2. The plurality of left-eye and right-eye images may provided in a stereoscopic video stream that is displayed on the displayed device 326. The display device may be located at a user terminal. Alternatively, the display device may be operably coupled to and detachable from the user terminal. In some cases, the display device may be remote from the user terminal. The display device may be configured to display a FPV of the environment using the decoded stereoscopic video data. A user may view the FPV of the environment on the display device.

In some instances, FPV images and/or video of the environment may be shown on the display device in real time as the imaging device on the movable object is taking images of one or more objects in the environment. The display device may be a device appropriate for displaying images and/or videos, for example, a LCD (Liquid Crystal Display), a CRT (Cathode Ray Tube), an OLED (Organic Light Emitting Diodes), or a Plasma. In some instances, the display may be provided on a mobile device, such as a cellphone, PDA, or tablet. In some embodiments, the display device may a wearable display device that is capable of displaying 3-D FPV stereoscopic data of the environment.

In some embodiments, the raw image data and/or the encoded video data may be directly transmitted to the user terminal without being stored in any form of medium. In some alternative embodiments, the raw image data captured by the imaging device and/or the encoded video data compressed by the encoder may be stored in a media storage (not shown) before the data is transmitted to the user terminal. The media storage may also be borne by the movable object. The media storage can be any type of storage medium capable of storing image or video data of a plurality of objects. The media storage can be provided as a CD, DVD, Blu-ray disc, hard disk, magnetic tape, flash memory card/drive, solid state drive, volatile or non-volatile memory, holographic data storage, and any other type of storage medium. As another example, the media storage can be a web server, an enterprise server, or any other type of computer server. The media storage can be computer programmed to accept requests (e.g., HTTP, or other protocols that can initiate data transmission) from one or more devices at the user terminal and to serve the user terminal with requested image data. In addition, the media storage can be a broadcasting facility, such as free-to-air, cable, satellite, and other broadcasting facility, for distributing image data. The media storage may also be a server in a data network (e.g., a cloud computing network). In some embodiments, the media storage may be located on-board the imaging device, the encoder, and/or the movable object. In some embodiments, the media storage may be located on the user terminal, such as a remote controller, a ground station, a server, etc. Any arrange or combination of the above components may be contemplated.

Figure 4:
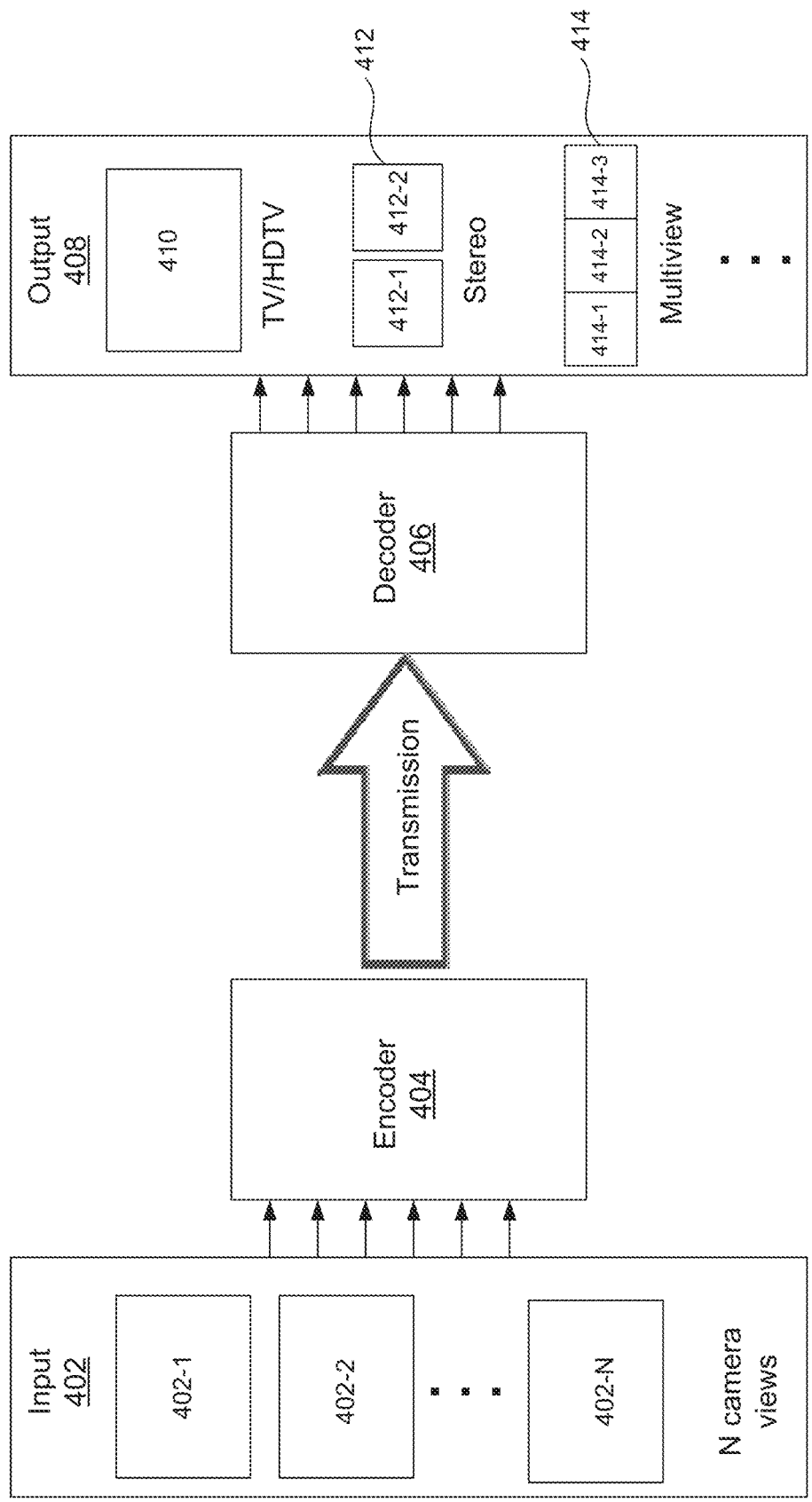
FIG. 4 illustrates an input and an output of the system in FIG. 3 in accordance with some embodiments.

FIG. 4 illustrates an input and an output of the system in FIG. 3 in accordance with some embodiments. As shown in FIG. 4, an input 402 may comprise multiple (N) image views of a same scene captured by N cameras (402-1, 402-2, . . . , 402-N) at different locations of a movable object. The input 402 may be transmitted to an encoder 404. The encoder may be any video encoder as described elsewhere herein. The plurality of cameras and the encoder may be located onboard a movable object. In some embodiments, the encoder may be a multiview video coding (MVC) encoder. The encoder may be configured to receive N temporally synchronized video streams and generate a bitstream. The bitstream may be transmitted from the movable object to a user terminal wirelessly via one or more communication units. In some instances, the bitstream may be stored on one or more memory units prior to transmission. The bitstream may be transmitted from the encoder 404 to a decoder 406. The decoder may or may not be located at the user terminal. In some embodiments, the decoder may be n multiview video coding (MVC) decoder. The decoder may be configured to receive and decode the bitstream, and output 408 a plurality of video signals to the user terminal. The plurality of video signals may comprise different types of video signals. For example, the video signals may comprise (1) terrestrial television signals 410 for televisions or high-definition TVs, (2) stereoscopic video 412 comprising left-eye images 412-1 and right-eye images 412-2, and/or (3) multiview video 414 comprising a plurality of different images captured from different views (e.g., 414-1, 414-2, and 414-3). The video signals be converted into images to be displayed on the user terminal. In some embodiments, the user terminal may include a display device capable of displaying stereoscopic image data and/or multiview image data. The display device may be a wearable device such as a head-mounted display or a pair of VR or AR-enabled glasses.

Figure 5:
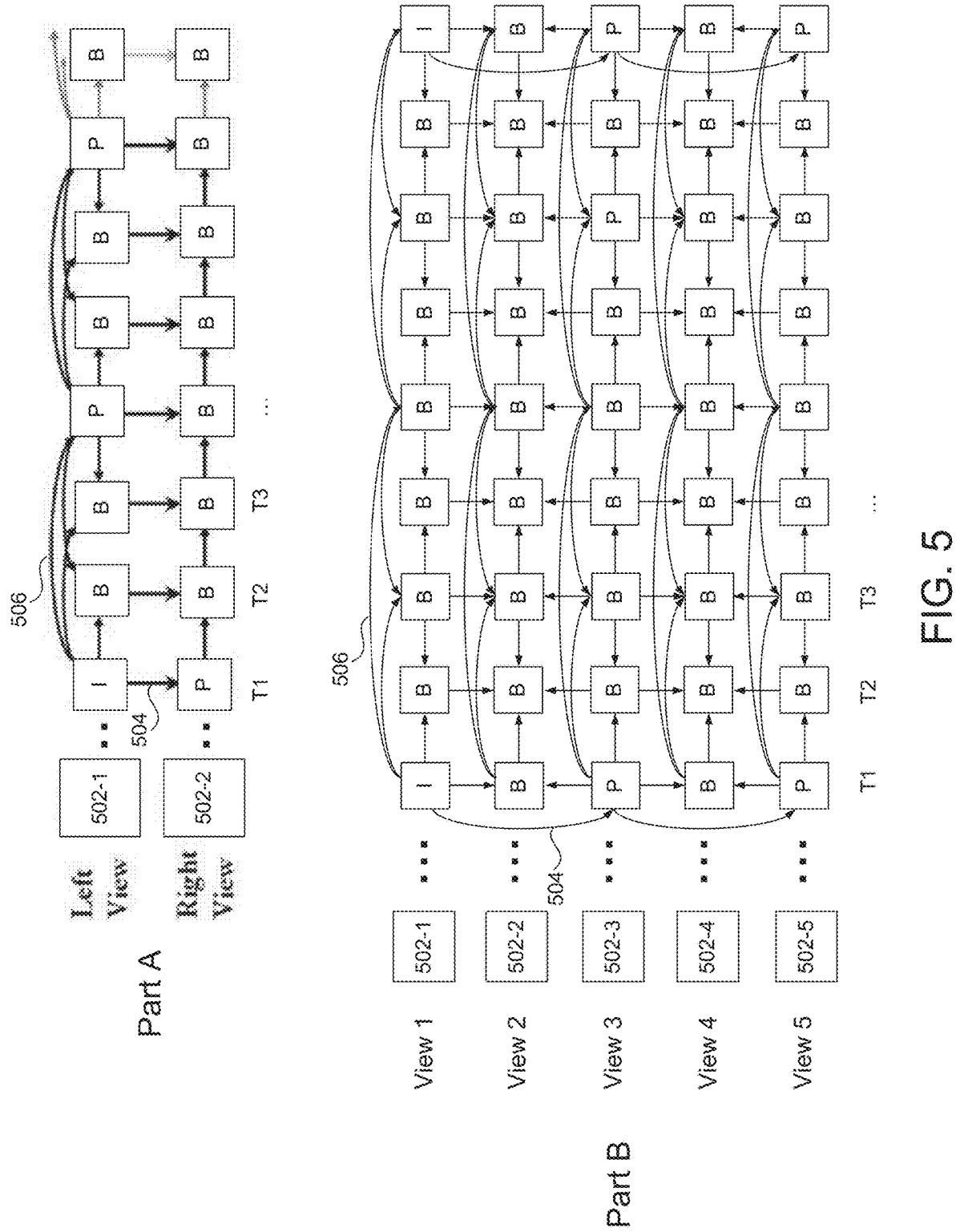
FIG. 5 illustrates multiview video coding (MVC) of images in accordance with some embodiments.

FIG. 5 illustrates multiview video coding (MVC) of images in accordance with some embodiments. MVC can provide a compact representation for multiple views of a video scene, such as multiple synchronized video cameras located on a movable object. MVC can also provide stereo-paired video for 3-D viewing. 3-D video may refer to an n-view multiview video representation, and which includes a stereo-view representation. 3-D video can be displayed on a display device through various channels, including stereoscopic video data transmitted from a movable object, cable and satellite transmission, terrestrial broadcast, and/or streaming and download through the Internet. 3-D video can offer a high-quality and immersive multimedia experience, for example when a user is operating a movable object (e.g., a UAV) based on FPV 3-D video that the user sees on a display device.

Multiview video coding (MVC) may be an extension of video compression standards such as the H.264/MPEG-4 AVC standard. MVC can be used to efficiently encode stereo and multiview video signals. Multi-view video sequences can be captured by multiple video cameras from different viewpoints. When the distance between the cameras is close enough (i.e., dense camera distribution), high correlations may exist between the pictures of different views. MVC can exploit not only the redundancies that exist temporally between the frames within a given view, but also the similarities between frames of neighboring views. By exploiting the redundancies and similarities, a reduction in bit rate relative to independent coding of the views can be achieved without sacrificing the reconstructed video quality.

Multiview video can be used to support 3-D video applications, where 3-D depth perception of a visual scene is provided on a display device. The display device may provide two views, where a left-eye view is presented to a viewer's left eye, and a right-eye view is presented to the viewer's right eye. The 3-D display technology ensures that the appropriate signals are viewed by the correct eye. This can be accomplished with either passive polarization or active shutter techniques.

The use of inter-view prediction in MVC may exploit both spatial and temporal redundancy for compression. Since the cameras (or rendered viewpoint perspectives) of a multiview scenario typically capture the same scene from nearby viewpoints, substantial inter-view redundancy is present. Part A of FIG. 5 shows a sample prediction structure for a 2-camera system. One or more video frames may be captured by a first camera 502-1 and a second camera 502-2. The first and second cameras may be located on a movable object (e.g., a UAV).

The video frames that are used in MVC may comprise different picture types, for example I-frames, P-frames, and B-frames. I-frames are the least compressible and do not require other video frames to decode. An I-frame is in effect a fully specified picture, similar to a conventional static image file. P-frames can use data from previous frames to decompress, and are more compressible than I-frames. A P-frame contains only the changes in an image from the previous frame. For example, in a scene where a car moves across a stationary background, only the car's movements need to be encoded. The encoder does not need to store the unchanging background pixels in the P-frame, thus saving space. P-frames are also known as delta-frames. B-frames can use both previous and forward frames for data reference to obtain the highest amount of data compression. A B-frame can save even more space compared to a P-frame, by using differences between the current frame and both the preceding and following frames to specify its content.

One or more images can be predicted from temporal reference frames as well as from inter-view reference frames. The inter-view prediction may occur between adjacent frames, between non-adjacent frames, etc., both temporally and spatially. For example, one or more images can be predicted inter-view 504 between the left view camera and the right view camera. At the same time, one or more images can be predicted both spatially and temporally (times T1, T2, T3, and so forth) 506 within each set of left view and right image frames. The inter-view prediction can be adaptive. In some cases, prediction among temporal and inter-view references can be selected on a block basis in terms of rate-distortion cost.

Part B of FIG. 5 is similar to part A of FIG. 5, except part B shows the inter-view prediction for a multi-camera system comprising more than two cameras. As shown in part B of FIG. 5, a picture of a certain camera can be predicted from temporally related pictures of the same camera. Additionally, pictures of neighboring cameras can be used for efficient prediction. In part B of FIG. 5, the system may comprise five cameras (502-1, 502-2, 502-3, 502-4, and 502-5) capturing images from different positions, at a same time or at different times. The plurality of cameras may be located on different parts of a movable object (e.g., a UAV).

Similar to part A of FIG. 5, the inter-view prediction 504 in part B may occur between adjacent frames, between non-adjacent frames, etc., both temporally and spatially (times T1, T2, T3, and so forth) 506. In some instances, the images captured by one or more cameras may be used as a base view that is independent of other views, and that is advanced video coding (AVC) compatible. For example, the images captured by camera 502-1 may be used as a base view from which images in other views are predicted.

In some embodiments, video data may be smoothed prior to displaying the video on a display device. The video data may be smoothed using one or more of the embodiments described later in FIGS. 6, 7, and 8. In some cases, video data may be smoothed prior to encoding of the video data onboard a movable object (see FIG. 7). In other cases, the video data may be smoothed after the video data has been decoded at a user terminal or a ground station that is remote from the movable object (see FIG. 8). When a display device is a head-mounted display or pair of VR or AR-enabled glasses, smoothing of video can help to reduce viewing discomfort caused by movement of the movable object and/or imaging device. For example, when the movable object is a UAV having a camera supported by a gimbal, user-controlled movements and/or vibrations of the gimbal and/or the UAV can result in image jitter and distortion, which can cause viewing discomfort, since the FPV is displayed on the display device in close proximity to the user's eyes.

Figure 6:
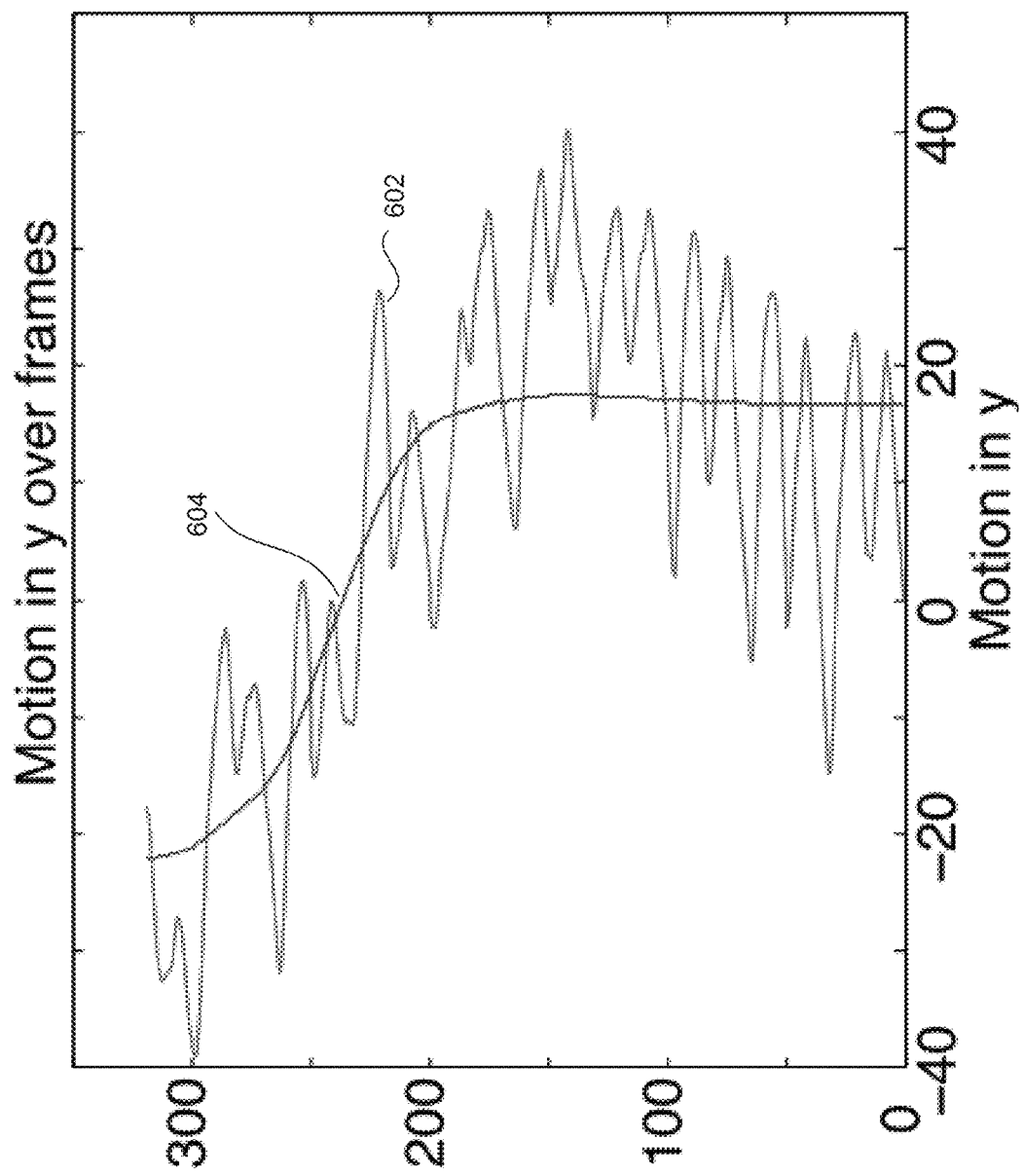
FIG. 6 illustrates the mapping of a virtual motion path of an imaging device to obtain a predetermined visual effect, in accordance with some embodiments.

FIG. 6 illustrates the motion of an imaging device over a number of video frames and mapping of a virtual motion path of the imaging device, in accordance with some embodiments. An imaging device may be in motion as it is capturing a plurality of images (or image frames). The imaging device may or may not be mounted to a movable object. Positional information of the imaging device can be obtained from an IMU on the imaging device, or from an IMU on a carrier that couples the imaging device to a movable object. The positional information may include a motion characteristic of the imaging device along and/or about any axis over time (or over the plurality of image frames). The plot in FIG. 6 shows the motion characteristic 602 of the imaging device along a y-axis (pitch axis) over a plurality of image frames. The motion characteristic may include perturbations which may be a result of vibration or user-induced actions. A virtual motion path 604 can be obtained by fitting a curve through the perturbations (data points). To smooth the video, a plurality of video frames may be mapped to the virtual motion path 604. The virtual motion path may be, for example a smooth virtual motion path.

In some embodiments, smoothing the video may comprise obtaining in real-time a reference position on the virtual motion path 604 of an imaging device, and modifying one or more image frames based on the reference position. For example, one or more processors for processing stereoscopic video data of an environment may be provided. The processor(s) may be located on the imaging device, movable object, user terminal, display device, and/or a ground station in communication with one or more of the aforementioned. In some embodiments, the processor(s) may be located at the encoder onboard the movable object. The processor(s) may be configured to obtain substantially in or near real-time a reference position of an imaging device located on the movable object based on one or more previously traversed positions of the imaging device. The previously traversed position(s) may be obtained using at least one sensor on the imaging device and/or movable object. The processor(s)

may be configured to modify an image frame in the stereoscopic video data based on (1) the reference position of the imaging device and (2) an actual position of the imaging device at which the image frame is taken.

The reference position on the virtual motion path of the imaging device may be calculated based on one or more previously traversed positions of the imaging device. For example, the reference position on the virtual motion path may be extrapolated or predicted based on the previously traversed position(s) of the imaging device. In some cases, a portion of the virtual motion path may be extended based on the previously traversed position(s) of the imaging device, and a reference position may be located on the extended portion of the virtual motion path. The reference position on the virtual motion path may be configured to compensate for sudden or large movements in the imaging device. The sudden or large movements can be caused by motion of the movable object, motion of a carrier to which the imaging device is coupled, or external disturbances from the environment. The sensor(s) may be located in an inertial measurement unit (IMU) operably coupled to the imaging device. The sensor(s) may comprise an accelerometer, a gyroscope, a compass, and/or a global positioning system (GPS) receiver. The sensor(s) can be configured to obtain position information, attitude information, and/or motion information of the imaging device.

An image frame in the stereoscopic video data can be modified using a transformation matrix. The transformation matrix can be calculated based on a change in motion characteristic between the image frame and a previous image frame. In some instances, the change in motion characteristic may comprise a rotation or translation of the image frame relative to the previous image frame. The change in the motion characteristic may be determined based on the actual position and a previously traversed position of the imaging device. The change in the motion characteristic can be obtained using the sensor(s) coupled to the imaging device and/or movable object. For example, the change in the motion characteristic can be obtained from an IMU operably coupled to the imaging device.

In some embodiments, a plurality of reference positions on the virtual motion path of the imaging device may be obtained. For example, the plurality of reference positions on the virtual motion path of the imaging device may be obtained (or calculated) based on a plurality of previously traversed positions of the imaging device. A virtual motion path of the imaging device can be generated based on the plurality of reference positions. The reference positions may be obtained at different points in time while at least one of the imaging device or the movable object is in motion. In some embodiments, generating the virtual motion path may comprise filtering out one or more previously traversed positions that do not overlap with the reference positions. The virtual motion path may be generated substantially in or near real-time while at least one of the imaging device or the movable object is in motion.

In some embodiments, a plurality of image frames in the video data may be modified based on the plurality of reference positions. The plurality of modified image frames may be mapped to the virtual motion path to obtain stereoscopic video data of the environment. In some embodiments, the mapping may comprise temporally stitching together the plurality of modified image frames according to the virtual motion path to generate stereoscopic video data of the environment. The stereoscopic video data may be mapped using a transformation matrix to generate smooth continuous image frames. A first person view (FPV) of the environment may be displayed on a device remote to the movable object based on the stereoscopic video data. The device may include a display device at a user terminal.

One or more processors may be configured to generate the virtual motion path of an imaging device based on positional information of the imaging device. The processor(s) may be located on the imaging device, movable object, user terminal, display device, and/or a ground station in communication with one or more of the aforementioned. In some embodiments, the processor(s) may be located at the encoder. In some cases, the imaging device may be located on a movable object such as a UAV. The positional information of the imaging device may be obtained using one or more sensors on the imaging device and/or movable object.

The positional information of the imaging device may comprise attitude information including a pitch angle, a yaw angle, and/or a roll angle of the imaging device relative to a reference frame. The reference frame may be established to the movable object or a world coordinate system. For example, the positional information of the imaging device may comprise position information including latitude coordinates, longitude coordinates, elevation, altitude, and/or a displacement of the imaging device. In some cases, the positional information of the imaging device may comprise motion information including a linear velocity, linear acceleration, angular velocity, and/or angular acceleration of the imaging device. The sensors(s) may comprise an accelerometer, a gyroscope, a compass, and/or a global positioning system (GPS) receiver. The sensor(s) may be located in an IMU that is operably coupled to the imaging device and configured to measure the positional information of the imaging device.

In some embodiments, the processor(s) may be configured to generate the virtual motion path by applying a filter to the positional information of the imaging device. The filter may comprise one or more low-order filters and/or higher-order filters. In some instances, the virtual motion path may be represented by a polynomial time-based function. The virtual motion path may be generated substantially in or near real-time while the imaging device and/or the movable object are in motion. The stereoscopic video data may be mapped spatially and temporally to the virtual motion path to obtain the stereoscopic video data of the environment.

The plurality of modified image frames (based on a plurality of reference positions) can be mapped spatially and temporally to the virtual motion path to obtain the stereoscopic video data of the environment. In some cases, the stereoscopic video data may be mapped by using at least one transformation matrix. The at least one transformation matrix may comprise a projection transformation matrix and a perspective transformation matrix. The projection transformation matrix may be determined based on a change in the positional information of the imaging device between a previous image frame and a current image frame. The change in the positional information of the imaging device may be obtained using the one or more sensors onboard the movable object. The change in the positional information of the imaging device may also be obtained by analyzing motion characteristics of one or more feature points in the previous image frame and the current image frame. The previous image frame and the current image frame may be captured by the imaging device at different points in time. A rotation and a translation of the current image frame can be determined using the projection transformation matrix. The perspective transformation matrix can be calculated based on the rotation and the translation of the current image frame. The stereoscopic video data can be mapped using the perspective transformation matrix to generate smooth continuous image frames.

Figure 7:
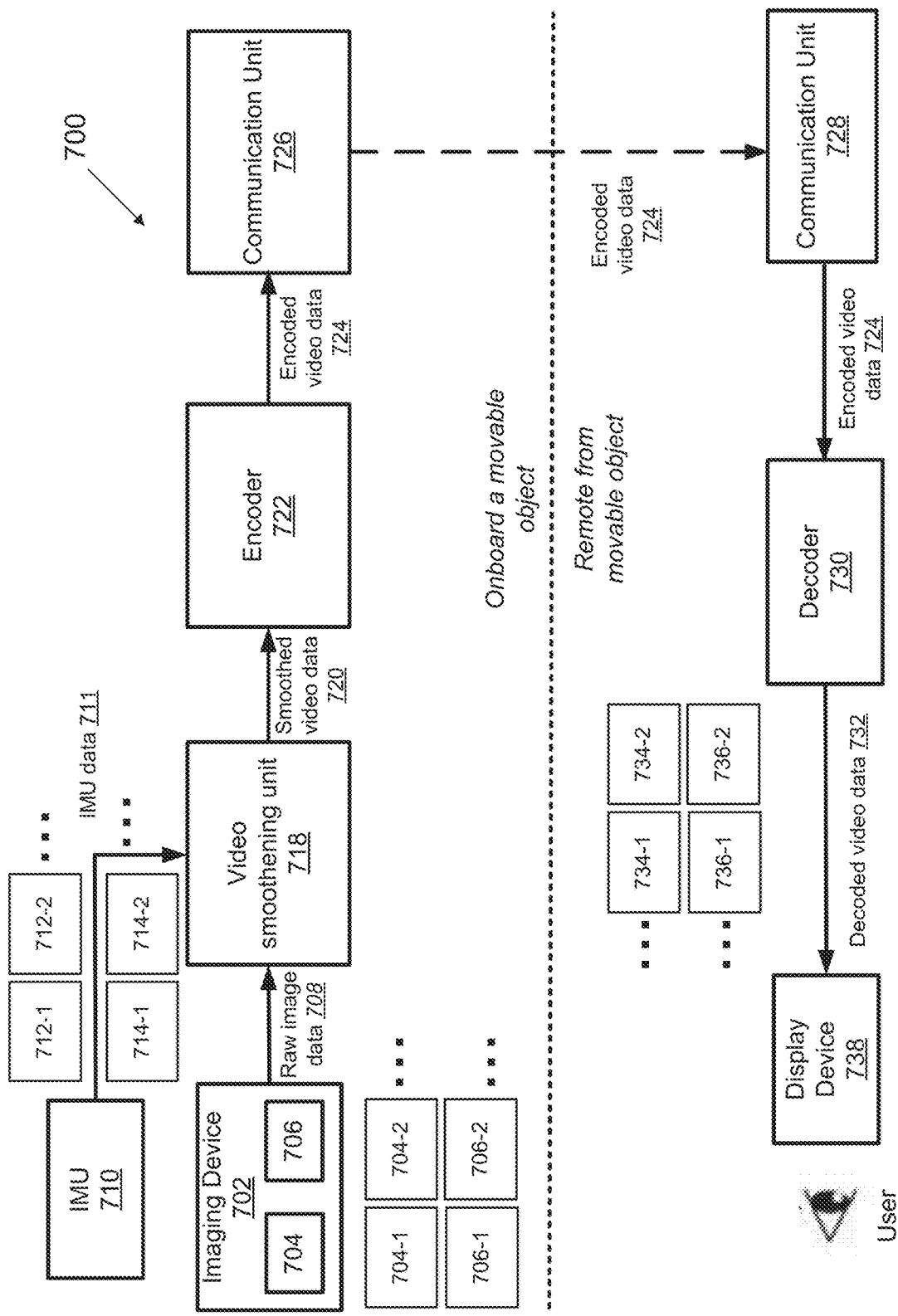
FIG. 7 shows a block diagram comprising a video smoothening unit (onboard a movable object) for processing video data prior to video encoding, in accordance with some embodiments.

FIG. 7 shows a block diagram 700 illustrating examples of components for processing images and/or video data to generate stereoscopic video data, in accordance with embodiments. The embodiment in FIG. 7 may be similar to the embodiment in FIG. 3, except FIG. 7 further includes a video smoothening unit 718 for smoothing raw image data prior to encoding of video data. The components in FIG. 7 may comprise a first group of components located onboard a movable object, and a second group of components located remotely from the movable object. In some embodiments, one or more components from the second group of components may be located on a user terminal.

The first group of components may comprise an imaging device 702, an inertial measurement unit (IMU) 710, a video smoothening unit 718, an encoder 722, and a communication unit 726. The imaging device 702, IMU 710, video smoothening unit 718, encoder 722, and the communication unit 726 may be mounted or co-located on the movable object. The imaging device may be operably coupled to the movable object via a carrier. Optionally, the imaging device may be disposed within a housing of the movable object. In some alternative embodiments (not shown), the imaging device may be implemented as a stand-alone device and need not be provided on a movable object. The IMU 710 may be mounted on the imaging device, or on the carrier to which the imaging device is coupled. The video smoothening unit 718 may be implemented using one or more processors onboard the movable object. The video smoothening unit may be configured to process raw video data of the environment to obtain a predetermined visual effect. Raw video data as used herein may include raw image data 708. The predetermined visual effect may comprise smooth rendering of the video data with reduced jitter. The predetermined visual effect can improve a perceived quality of video playback. The video smoothening unit 718 may be configured to process the raw image data 708 into smoothed video data 720. The encoder 722 may be implemented using one or more processors onboard the movable object. The encoder may include video codec processors for encoding the smoothed video data 720 to generate stereoscopic video data (provided within encoded video data 724). The encoder may include a video encoder. The communication unit 726 may be located within a body of the movable object. The communication unit may include one or more processors configured to transmit the encoded video data 724 from the movable object directly or indirectly to a user terminal.

In some embodiments, the imaging device 702 may comprise a plurality of imaging devices configured to capture multiple image views. For example, the imaging device 702 may comprise a first imaging device 704 configured to capture a plurality of images 704-1, 704-2, and so forth. The imaging device 702 may further comprise a second imaging device 706 configured to capture a plurality of images 706-1, 706-2, and so forth. The plurality of images 704-1, 704-2, 706-1, and 706-2 may correspond to multiple image views that are taken by the first and second imaging devices from different angles/positions, and/or at a same or different time instances. The multiple image views may be provided in the form of raw image data 708. The IMU 710 may be configured to concurrently obtain positional information (IMU data 711) of the imaging device 702 (e.g., positional information of the first and second imaging devices 704 and 706) at each time instance that an image is being captured. For example, the IMU 710 may obtain positional information 712-1 of the first imaging device 704 corresponding to when the image 704-1 is captured at time t1, and positional information 712-2 of the first imaging device 704 corresponding to when the image 704-2 is captured at time t2. Similarly, the IMU may obtain positional information 714-1 of the second imaging device 706 corresponding to when the image 706-1 is captured at time t1', and positional information 714-2 of the second imaging device 706 corresponding to when the image 706-2 is captured at time t2'. The times t1 and t1' may be the same or different points in time. The times t2 and t2' may be the same or different points in time.

The video smoothening unit 718 may be configured to obtain substantially in or near real-time a reference position of the imaging device based on one or more previously traversed positions of the imaging device. The one or more previously traversed positions of the imaging device may be obtained from the positional information collected by the IMU as the different images are being captured. The video smoothening unit 718 may be configured to modify one or more image frames in the raw image data 708 based on (1) a reference position of the imaging device and (2) an actual position of the imaging device at which the image frame is taken, as described elsewhere herein. The video smoothening unit 718 may be further configured to generate a virtual motion path of the imaging device based on positional information of the imaging device, and map modified video data to the virtual motion path to obtain the predetermined visual effect (e.g., a smooth visual effect). The modified video data may comprise a plurality of image frames that have been modified based on a plurality of reference positions of the imaging device, as described elsewhere herein.

The video smoothening unit 718 may be configured to provide the smoothed video data 720 to the encoder 722. The encoder may be configured to encode the smoothed video data 720 using multi-ocular joint encoding. The multi-ocular joint encoding as described herein may comprise inter-frame prediction of the plurality of images based on positional information of the imaging device(s) at each time instance that an image is captured.

In some embodiments, the encoder may be configured to process the smoothed video data, by encoding the smoothed video data of the environment to generate stereoscopic video data onboard the movable object. The stereoscopic video data may be generated by fusing together multiple image views in the smoothed video data. In some embodiments, the smoothed video data may be encoded using multi-ocular joint encoding. The multi-ocular joint encoding may comprise inter-frame prediction based on positional information of the imaging device. The positional information of the imaging device may be obtained from the IMU. The multi-ocular joint encoding may comprise applying inter-frame prediction between multiple image views captured by the imaging device at a same moment or at different moments.

In some embodiments, the multi-ocular joint encoding may comprise applying a Multiview Video Coding (MVC) format to the smoothed video data. For example, the encoder 722 may be configured to apply the MVC format to the smoothed video data. Applying the MVC format may comprise (1) correlating the smoothed video data obtained by the imaging device(s), and (2) reducing information redundancy in the smoothed video data. In some other embodiments, the multi-ocular joint encoding may comprise applying a High Efficiency Video Coding (HEVC) format to the smoothed video data. In some embodiments, the smoothed video data may be encoded by the one or more processors in the encoder 722 substantially in or near real-time as the smoothed video data is being generated by the video smoothening unit 718.

The communication unit 726 onboard the movable object may be configured to transmit the encoded video data 724 (comprising onboard-generated stereoscopic video data) to a communication unit 728 remote from the movable object. The communication unit 728 may or may not be located at a user terminal. The user terminal may or may not be located on the ground. The user terminal may be located remotely from the movable object. In some instances, the communication unit 728 may be located at a ground station in communication with the movable object and the user terminal. The user terminal and the movable object may be in communication with each other via the communication units 726 and 728. The encoded video data 724 may be transmitted from the movable object to the user terminal via a downlink. The user terminal may transmit various control signals (not shown) to the movable object via an uplink. Each of the uplink and the downlink may be wireless link. The wireless link may include a RF (radio frequency) link, a Wi-Fi link, a Bluetooth link, a 3G link, or a LTE link. In some cases, the communication unit 726 may be a component of the imaging device, the video smoothening unit, and/or the encoder. For example, the imaging device, the video smoothening unit, and/or the encoder may comprise one or more transceivers. In some cases, the communication unit 728 may be a component of the display device and/or a decoder.

In some embodiments, the encoded video data 724 may comprise high-definition stereoscopic video data. In other embodiments, the processed video data 724 may comprise ultra high-definition stereoscopic video data.

The communication unit 728 may in turn transmit the encoded video data 724 to a decoder 730. The decoder may be a video decoder, or may comprise a video decoder. The decoder may be implemented using one or more processors at a user terminal and/or at a ground station. In some cases, the decoder may be implemented on a display device 738. The decoder may be configured to decompress the processed image data processed by the encoder. The decoder may be configured to decode the encoded video data 724 to retrieve the stereoscopic video data, and transmit the stereoscopic video data (in decoded video data 732) to the display device 738. As previously described, the stereoscopic video data may be generated from the smoothed video data of the environment. The stereoscopic video data may comprise a plurality of left-eye images 734-1 and 734-2 and a plurality of right-eye images 736-1 and 736-2. The plurality of left-eye and right-eye images may be provided in a stereoscopic video stream configured to be displayed on the display device 738. The display device may be located at a user terminal. Alternatively, the display device may be operably coupled to and detachable from the user terminal. In some cases, the display device may be remote from the user terminal. The display device may be configured to display a FPV of the environment using the decoded stereoscopic video data. A user may view the FPV of the environment on the display device.

In some instances, FPV images and/or video of the environment may be shown on the display device in real time as the imaging device on the movable object is taking images of one or more objects in the environment. The display device may be a device appropriate for displaying images and/or videos, for example, a LCD (Liquid Crystal Display), a CRT (Cathode Ray Tube), an OLED (Organic Light Emitting Diodes), or a Plasma. In some instances, the display may be provided on a mobile device, such as a cellphone, PDA, or tablet. In some embodiments, the display device may a wearable display device that is capable of displaying 3-D FPV stereoscopic data of the environment.

In some embodiments, the raw image data, smoothed video data, and/or encoded video data may be directly transmitted to the user terminal without being stored in any form of medium. In some alternative embodiments, the raw image data captured by the imaging device, the smoothed video data generated by the video smoothening unit, and/or the encoded video data compressed by the encoder may be stored in a media storage (not shown) before the data is transmitted to the user terminal. The media storage may also be borne by the movable object. The media storage can be any type of storage medium capable of storing image or video data of a plurality of objects. The media storage can be provided as a CD, DVD, Blu-ray disc, hard disk, magnetic tape, flash memory card/drive, solid state drive, volatile or non-volatile memory, holographic data storage, and any other type of storage medium. As another example, the media storage can be a web server, an enterprise server, or any other type of computer server. The media storage can be computer programmed to accept requests (e.g., HTTP, or other protocols that can initiate data transmission) from one or more devices at the user terminal and to serve the user terminal with requested image data. In addition, the media storage can be a broadcasting facility, such as free-to-air, cable, satellite, and other broadcasting facility, for distributing image data. The media storage may also be a server in a data network (e.g., a cloud computing network). In some embodiments, the media storage may be located on-board the imaging device, the encoder, and/or the movable object. In some embodiments, the media storage may be located on the user terminal, such as a remote controller, a ground station, a server, etc. Any arrange or combination of the above components may be contemplated.

Figure 8:
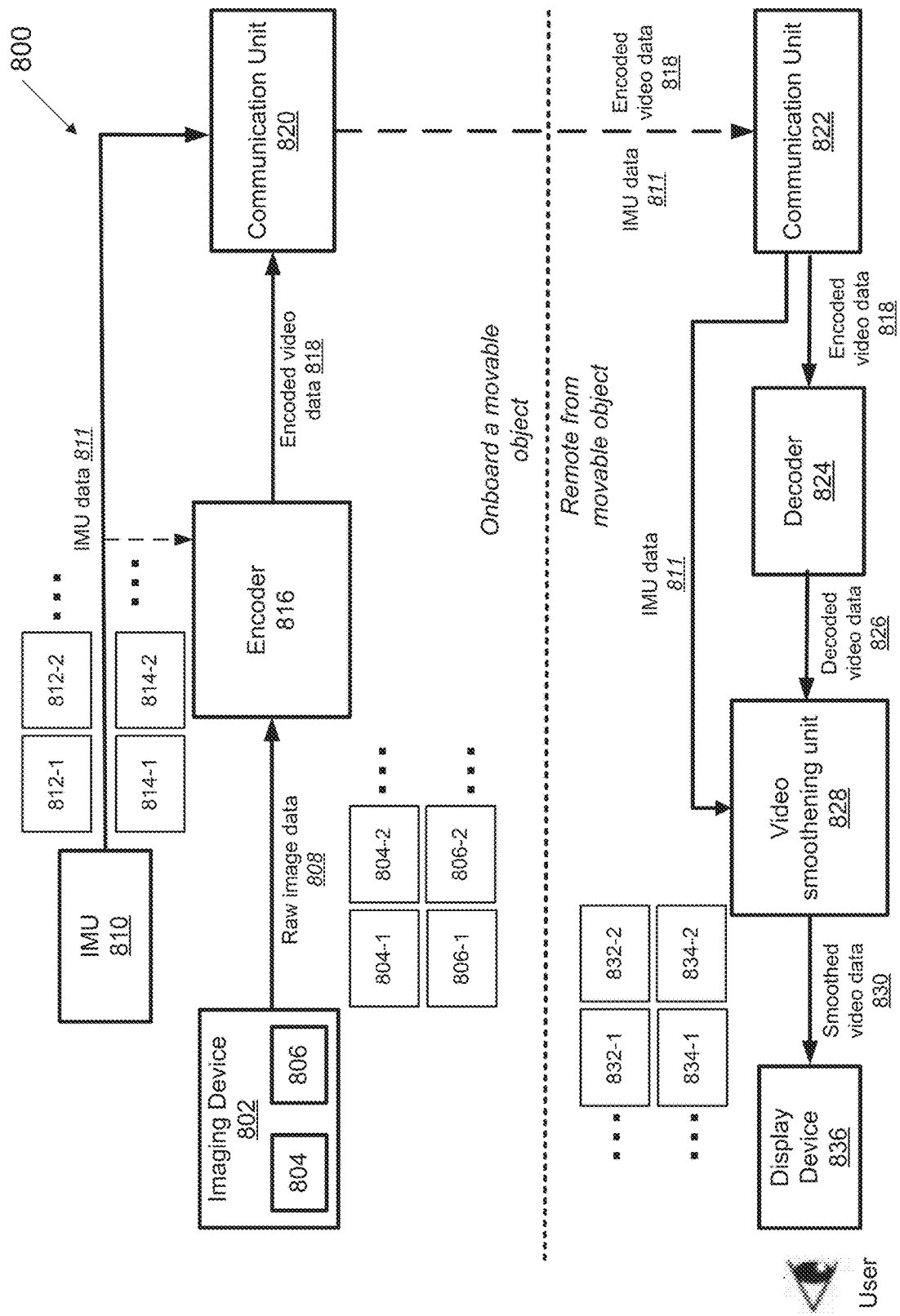
FIG. 8 shows a block diagram comprising a video smoothening unit (remote from a movable object) for processing video data after video decoding, in accordance with some embodiments.

FIG. 8 shows a block diagram 800 illustrating examples of components for processing images and/or video data to generate stereoscopic video data, in accordance with embodiments. The embodiment in FIG. 8 may be similar to the embodiments in FIGS. 3 and 7, except the video smoothening unit 828 in FIG. 8 is located remotely from the movable object, and is configured to smooth video data after it has been decoded. The components in FIG. 8 may comprise a first group of components located onboard a movable object, and a second group of components located remotely from the movable object. In some embodiments, one or more components from the second group of components may be located on a user terminal.

The first group of components may comprise an imaging device 802, an inertial measurement unit (IMU) 810, an encoder 816, and a communication unit 820. The imaging device 802, IMU 810, encoder 816, and the communication unit 820 may be mounted or co-located on the movable object. The imaging device may be operably coupled to the movable object via a carrier. Optionally, the imaging device may be disposed within a housing of the movable object. In some alternative embodiments (not shown), the imaging device may be implemented as a stand-alone device and need not be provided on a movable object. The IMU 810 may be mounted on the imaging device, or on the carrier to which the imaging device is coupled. The encoder 816 may be implemented using one or more processors onboard the movable object. The encoder may include video codec processors for encoding raw image data 808 to generate stereoscopic video data (provided within encoded video data 818). The encoder may include a video encoder. The communication unit 820 may be located within a body of the movable object. The communication unit may include one or more processors configured to transmit the encoded video data 818 from the movable object directly or indirectly to a user terminal.

In some embodiments, the imaging device 802 may comprise a plurality of imaging devices configured to capture multiple image views. For example, the imaging device 802 may comprise a first imaging device 804 configured to capture a plurality of images 804-1, 804-2, and so forth. The imaging device 802 may further comprise a second imaging device 806 configured to capture a plurality of images 806-1, 806-2, and so forth. The plurality of images 804-1, 804-2, 806-1, and 806-2 may correspond to multiple image views that are taken by the first and second imaging devices from different angles/positions, and/or at a same or different time instances. The multiple image views may be provided in the form of raw image data 808. The IMU 810 may be configured to concurrently obtain positional information (IMU data 811) of the imaging device 802 (e.g., positional information of the first and second imaging devices 804 and 806) at each time instance that an image is being captured. For example, the IMU may obtain positional information 812-1 of the first imaging device 804 corresponding to when the image 804-1 is captured at time t1, and positional information 812-2 of the first imaging device 804 corresponding to when the image 804-2 is captured at time t2. Similarly, the IMU may obtain positional information 814-1 of the second imaging device 806 corresponding to when the image 806-1 is captured at time t1', and positional information 814-2 of the second imaging device 806 corresponding to when the image 806-2 is captured at time t2'. The times t1 and t1' may be a same or different points in time. The times t2 and t2' may be a same or different points in time.

The imaging device 802 may be configured to provide the raw image data 808 to the encoder 816. The encoder may be configured to encode the raw video data 816 using multi-ocular joint encoding. The multi-ocular joint encoding as described herein may comprise inter-frame prediction of the plurality of images based on positional information of the imaging device(s) at each time instance that an image is captured.

In some embodiments, the encoder may be configured to process the raw video data, by encoding the raw video data of the environment to generate stereoscopic video data onboard the movable object. The stereoscopic video data may be generated by fusing together multiple image views in the raw video data. In some embodiments, the raw video data may be encoded using multi-ocular joint encoding. The multi-ocular joint encoding may comprise inter-frame prediction based on positional information of the imaging device. The positional information of the imaging device may be obtained from the IMU. The multi-ocular joint encoding may comprise applying inter-frame prediction between multiple image views captured by the imaging device at a same moment or at different moments.

In some embodiments, the multi-ocular joint encoding may comprise applying a Multiview Video Coding (MVC) format to the raw video data. For example, the encoder 816 may be configured to apply the MVC format to the raw video data. Applying the MVC format may comprise (1) correlating the raw video data obtained by the imaging device(s), and (2) reducing information redundancy in the raw video data. In some other embodiments, the multi-ocular joint encoding may comprise applying a High Efficiency Video Coding (HEVC) format to the raw video data. In some embodiments, the raw video data may be encoded by the one or more processors in the encoder 816 substantially in or near real-time as the raw video data is being generated by the imaging device 802.

The IMU 810 may be configured to transmit positional information (IMU data 811) of the imaging device 802 to the encoder 816 and/or the communication unit 820. The communication unit 820 onboard the movable object may be configured to transmit the encoded video data 818 (comprising onboard-generated stereoscopic video data) and IMU data 811 to a communication unit 822 remote from the movable object. The communication unit 822 may or may not be located at a user terminal. The user terminal may or may not be located on the ground. The user terminal may be located remotely from the movable object. In some instances, the communication unit 822 may be located at a ground station in communication with the movable object and the user terminal. The user terminal and the movable object may be in communication with each other via the communication units 820 and 822. The encoded video data 818 and the IMU data 811 may be transmitted from the movable object to the user terminal via a downlink. The user terminal may transmit various control signals (not shown) to the movable object via an uplink. Each of the uplink and the downlink may be wireless link. The wireless link may include a RF (radio frequency) link, a Wi-Fi link, a Bluetooth link, a 3G link, or a LTE link. In some cases, the communication unit 820 may be a component of the imaging device and/or the encoder. For example, the imaging device and/or the encoder may comprise one or more transceivers. In some cases, the communication unit 822 may be a component of the display device, a decoder, and/or a video smoothening unit.

In some embodiments, the encoded video data 818 may comprise high-definition stereoscopic video data. In other embodiments, the processed video data 818 may comprise ultra high-definition stereoscopic video data.

The communication unit 822 may in turn transmit the encoded video data 818 to a decoder 824. The decoder may be a video decoder, or may comprise a video decoder. The decoder may be implemented using one or more processors at a user terminal and/or at a ground station. The decoder may be configured to decompress the processed image data encoded by the encoder. The decoder may be configured to decode the encoded video data 818 to retrieve the stereoscopic video data, and transmit the stereoscopic video data to a video smoothening unit 828. The communication unit 822 may be configured to transmit the IMU data 811 of the imaging device 820 to the video smoothening unit 828.

The video smoothening unit 828 may be implemented using one or more processors remote from the movable object. The video smoothening unit 828 may be configured to process the stereoscopic video data to obtain a predetermined visual effect. The predetermined visual effect may comprise smooth rendering of the stereoscopic video data with reduced jitter. The predetermined visual effect can improve a perceived quality of video playback. The video smoothening unit 828 may be configured to process the decoded video data 826 into smoothed video data 830.

The video smoothening unit 828 may be configured to obtain a reference position of the imaging device based on one or more previously traversed positions of the imaging device. The one or more previously traversed positions of each imaging device may be obtained from the positional information (IMU data 811) collected by the IMU 810 as the different images are being captured. The video smoothening unit 828 may be configured to modify one or more image frames in the decoded video data 826 based on (1) a reference position of the imaging device and (2) an actual position of the imaging device at which the image frame is taken, as described elsewhere herein. The video smoothening unit 828 may be further configured to generate a virtual motion path of the imaging device based on positional information of the imaging device, and map modified video data to the virtual motion path to obtain the predetermined visual effect (e.g., a smooth visual effect). The modified video data may comprise a plurality of image frames that have been modified based on a plurality of reference positions of the imaging device, as described elsewhere herein.

The video smoothening unit 828 may be configured to provide the smoothed video data 830 to the display device 836. The smoothed video data may comprise smoothed stereoscopic video data of the environment. The stereoscopic video data may comprise a plurality of left-eye images 832-1 and 832-2 and a plurality of right-eye images 834-1 and 834-2. The plurality of left-eye and right-eye images may be provided in a stereoscopic video stream configured to be displayed on the display device 836. The display device may be located at a user terminal. Alternatively, the display device may be operably coupled to and detachable from the user terminal. In some cases, the display device may be remote from the user terminal. The display device may be configured to display a FPV of the environment using the decoded stereoscopic video data. A user may view the FPV of the environment on the display device.

In some instances, FPV images and/or video of the environment may be shown on the display device in real time as the imaging device on the movable object is taking images of one or more objects in the environment. The display device may be a device appropriate for displaying images and/or videos, for example, a LCD (Liquid Crystal Display), a CRT (Cathode Ray Tube), an OLED (Organic Light Emitting Diodes), or a Plasma. In some instances, the display may be provided on a mobile device, such as a cellphone, PDA, or tablet. In some embodiments, the display device may a wearable display device that is capable of displaying 3-D FPV stereoscopic data of the environment.

Figure 9:
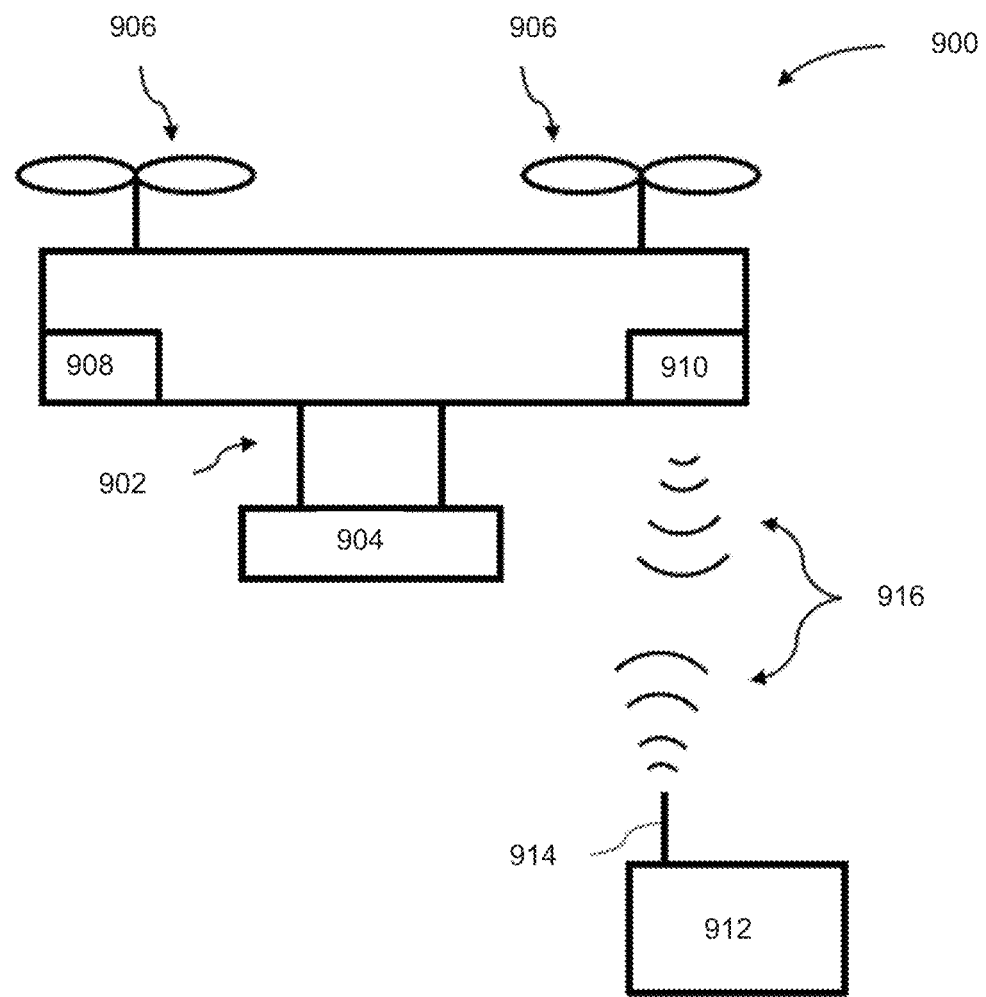
FIG. 9 is a schematic block diagram of a system for controlling a movable object, in accordance with some embodiments.

FIG. 9 illustrates a movable object 900 including a carrier 902 and a payload 904, in accordance with embodiments. Although the movable object 900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 904 may be provided on the movable object 900 without requiring the carrier 902. The movable object 900 may include propulsion mechanisms 906, a sensing system 908, and a communication system 910.

The propulsion mechanisms 906 can include one or more of rotors, propellers, blades, engines, motors, wheels, axles, magnets, or nozzles, as previously described. For example, the propulsion mechanisms 906 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 906 can be mounted on the movable object 900 using any suitable means, such as a support element (e.g., a drive shaft) as described elsewhere herein. The propulsion mechanisms 906 can be mounted on any suitable portion of the movable object 900, such on the top, bottom, front, back, sides, or suitable combinations thereof.

In some embodiments, the propulsion mechanisms 906 can enable the movable object 900 to take off vertically from a surface or land vertically on a surface without requiring any horizontal movement of the movable object 900 (e.g., without traveling down a runway). Optionally, the propulsion mechanisms 906 can be operable to permit the movable object 900 to hover in the air at a specified position and/or orientation. One or more of the propulsion mechanisms 900 may be controlled independently of the other propulsion mechanisms. Alternatively, the propulsion mechanisms 900 can be configured to be controlled simultaneously. For example, the movable object 900 can have multiple horizontally oriented rotors that can provide lift and/or thrust to the movable object. The multiple horizontally oriented rotors can be actuated to provide vertical takeoff, vertical landing, and hovering capabilities to the movable object 900. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 900 (e.g., with respect to up to three degrees of translation and up to three degrees of rotation).

The sensing system 1008 can include one or more sensors that may sense the spatial disposition, velocity, and/or acceleration of the movable object 900 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 908 can be used to control the spatial disposition, velocity, and/or orientation of the movable object 900 (e.g., using a suitable processing unit and/or control module, as described below). Alternatively, the sensing system 908 can be used to provide data regarding the environment surrounding the movable object, such as weather conditions, proximity to potential obstacles, location of geographical features, location of manmade structures, and the like.

The communication system 910 enables communication with terminal 912 having a communication system 914 via wireless signals 916. The communication systems 910, 914 may include any number of transmitters, receivers, and/or transceivers suitable for wireless communication. The communication may be one-way communication, such that data can be transmitted in only one direction. For example, one-way communication may involve only the movable object 900 transmitting data to the terminal 912, or vice-versa. The data may be transmitted from one or more transmitters of the communication system 910 to one or more receivers of the communication system 912, or vice-versa. Alternatively, the communication may be two-way communication, such that data can be transmitted in both directions between the movable object 900 and the terminal 912. The two-way communication can involve transmitting data from one or more transmitters of the communication system 1010 to one or more receivers of the communication system 914, and vice-versa.

In some embodiments, the terminal 912 can provide control data to one or more of the movable object 900, carrier 902, and payload 904 and receive information from one or more of the movable object 900, carrier 902, and payload 904 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 906), or a movement of the payload with respect to the movable object (e.g., via control of the carrier 902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 908 or of the payload 904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 912 can be configured to control a state of one or more of the movable object 900, carrier 902, or payload 904. Alternatively or in combination, the carrier 902 and payload 904 can also each include a communication module configured to communicate with terminal 912, such that the terminal can communicate with and control each of the movable object 900, carrier 902, and payload 904 independently.

In some embodiments, the movable object 900 can be configured to communicate with another remote device in addition to the terminal 912, or instead of the terminal 912. The terminal 912 may also be configured to communicate with another remote device as well as the movable object 900. For example, the movable object 900 and/or terminal 912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 900, receive data from the movable object 900, transmit data to the terminal 912, and/or receive data from the terminal 912. Optionally, the remote device can be connected to the Internet or other telecommunications network, such that data received from the movable object 900 and/or terminal 912 can be uploaded to a website or server.

In some embodiments, a system for controlling a movable object may be provided in accordance with embodiments. The system can be used in combination with any suitable embodiment of the systems, devices, and methods disclosed herein. The system can include a sensing module, processing unit, non-transitory computer readable medium, control module, and communication module.

The sensing module can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module can be operatively coupled to a processing unit having a plurality of processors. In some embodiments, the sensing module can be operatively coupled to a transmission module (e.g., a Wi-Fi image transmission module) configured to directly transmit sensing data to a suitable external device or system. For example, the transmission module can be used to transmit images captured by a camera of the sensing module to a remote terminal.

The processing unit can have one or more processors, such as a programmable processor (e.g., a central processing unit (CPU)). The processing unit can be operatively coupled to a non-transitory computer readable medium. The non-transitory computer readable medium can store logic, code, and/or program instructions executable by the processing unit for performing one or more steps. The non-transitory computer readable medium can include one or more memory units (e.g., removable media or external storage such as an SD card or random access memory (RAM)). In some embodiments, data from the sensing module can be directly conveyed to and stored within the memory units of the non-transitory computer readable medium. The memory units of the non-transitory computer readable medium can store logic, code and/or program instructions executable by the processing unit to perform any suitable embodiment of the methods described herein. For example, the processing unit can be configured to execute instructions causing one or more processors of the processing unit to analyze sensing data produced by the sensing module. The memory units can store sensing data from the sensing module to be processed by the processing unit. In some embodiments, the memory units of the non-transitory computer readable medium can be used to store the processing results produced by the processing unit.

In some embodiments, the processing unit can be operatively coupled to a control module configured to control a state of the movable object. For example, the control module can be configured to control the propulsion mechanisms of the movable object to adjust the spatial disposition, velocity, and/or acceleration of the movable object with respect to six degrees of freedom. Alternatively or in combination, the control module can control one or more of a state of a carrier, payload, or sensing module.

The processing unit can be operatively coupled to a communication module configured to transmit and/or receive data from one or more external devices (e.g., a terminal, display device, or other remote controller). Any suitable means of communication can be used, such as wired communication or wireless communication. For example, the communication module can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module can transmit and/or receive one or more of sensing data from the sensing module, processing results produced by the processing unit, predetermined control data, user commands from a terminal or remote controller, and the like.

The components of the system can be arranged in any suitable configuration. For example, one or more of the components of the system can be located on the movable object, carrier, payload, terminal, sensing system, or an additional external device in communication with one or more of the above. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A method for processing video data of an environment, comprising, with aid of one or more processors individually or collectively:
    obtaining in or near real-time a first reference position and a second reference position of an imaging device located on a movable object based on one or more previously traversed positions of the imaging device, the first reference position and the second reference position being obtained at different points in time,
    wherein:
        the one or more previously traversed positions are obtained using at least one sensor on the movable object and the video data is acquired by the imaging device, and
        the first reference position and the second reference position form a virtual motion path of the imaging device;
    modifying a first image frame in the video data to obtain a first modified image frame using a transformation matrix that is based on the first reference position of the imaging device and an actual position of the imaging device at which the first image frame is taken, and obtaining a second modified image frame based on a second image frame in the video data and the second reference position of the imaging device; and
    mapping the first modified image frame and the second modified image frame to the virtual motion path with respect to time.

2. The method of claim 1, wherein the first reference position and the second reference position are predicted based on the one or more previously traversed positions of the imaging device.

3. The method of claim 1, wherein the at least one sensor:
    is located in an inertial measurement unit (IMU) operably coupled to the imaging device or includes at least one of an accelerometer, a gyroscope, a compass, or a global positioning system (GPS) receiver; and
    is configured to obtain at least one of position information, attitude information, or motion information of the imaging device.

4. The method of claim 1, further comprising:
    encoding the video data including the first modified image frame and the second modified image frame to generate stereoscopic video data.

5. The method of claim 1, wherein the transformation matrix is calculated based on a change in motion characteristic between the first image frame and a previous image frame.

6. The method of claim 5, wherein the change in motion characteristic includes a rotation or translation of the first image frame relative to the previous image frame.

7. The method of claim 5, wherein the change in motion characteristic is determined based on the actual position and one of the one or more previously traversed positions of the imaging device, and is obtained using the at least one sensor on the movable object.

8. The method of claim 1, further comprising generating the virtual motion path and filtering out at least one of the one or more previously traversed positions that does not overlap with the first reference position or the second reference position.

9. The method of claim 1, wherein the virtual motion path is generated in or near real-time while at least one of the imaging device or the movable object is in motion.

10. The method of claim 1, wherein mapping the first modified image frame and the second modified image frame includes temporally stitching together the first modified image frame and the second modified image frame according to the virtual motion path to generate stereoscopic video data of the environment.

11. The method of claim 10, wherein the stereoscopic video data is mapped using the transformation matrix to generate smooth continuous image frames.

12. The method of claim 1, wherein the imaging device includes a multi-ocular video camera operably coupled to the movable object.

13. The method of claim 12, wherein the multi-ocular video camera includes a binocular video camera mounted in a forward-looking direction of the movable object.

14. The method of claim 1, wherein a plurality of imaging devices are operably coupled to different sides of the movable object.

15. The method of claim 1, wherein the imaging device is operably coupled to the movable object via a carrier.

16. The method of claim 15, wherein the carrier includes a multi-axis gimbal.

17. The method of claim 1, wherein the first reference position is obtained by an extrapolation from the one or more previously traversed positions of the imaging device.

18. The method of claim 1, wherein modifying the first image frame to obtain the first modified image frame further comprises modifying the first image frame based on the first reference position and a change in motion characteristic of the imaging device determined based on the actual position of the imaging device at which the first image frame is taken and one of the one or more previously traversed positions of the imaging device.

19. An apparatus for processing video data of an environment, comprising:
   one or more processors; and
   one or more non-transitory computer readable storage media coupled to the one or more processors and storing instructions that, when executed by the one or more processors, cause the one or more processors to, individually or collectively:
      obtain in or near real-time a first reference position and a second reference position of an imaging device located on a movable object based on one or more previously traversed positions of the imaging device, the first reference position and the second reference position being obtained at different points in time,
   wherein:
      the one or more previously traversed positions are obtained using at least one sensor on the movable object and the video data is acquired by the imaging device, and
      the first reference position and the second reference position form a virtual motion path of the imaging device;
      modify a first image frame in the video data to obtain a first modified image frame using a transformation matrix that is based on the first reference position of the imaging device and an actual position of the imaging device at which the first image frame is taken, and obtain a second modified image frame based on a second image frame in the video data and the second reference position of the imaging device; and
      map the first modified image frame and the second modified image frame to the virtual motion path with respect to time.

20. A non-transitory computer-readable medium storing instructions that, when executed, cause a computer to perform a method processing video data of an environment, the method comprising:
   obtaining in or near real-time a first reference position and a second reference position of an imaging device located on a movable object based on one or more previously traversed positions of the imaging device, the first reference position and the second reference position being obtained at different points in time,
   wherein:
      the one or more previously traversed positions are obtained using at least one sensor on the movable object and the video data is acquired by the imaging device, and
      the first reference position and the second reference position form a virtual motion path of the imaging device;
      modifying a first image frame in the video data to obtain a first modified image frame using a transformation matrix that is based on the first reference position of the imaging device and an actual position of the imaging device at which the first image frame is taken, and obtaining a second modified image frame based on a second image frame in the video data and the second reference position of the imaging device; and
      mapping the first modified image frame and the second modified image frame to the virtual motion path with respect to time.

* * * * *